(12) United States Patent
Gupta et al.

(10) Patent No.: US 10,630,971 B2
(45) Date of Patent: Apr. 21, 2020

(54) AUTOMATIC CALIBRATION OF PTZ CAMERA SYSTEM

(71) Applicant: AVIGILON FORTRESS CORPORATION, Vancouver (CA)

(72) Inventors: Himaanshu Gupta, Herdon, VA (US); Andrew J. Chosak, Bethleham, PA (US); Geoffrey R. Taylor, Reston, VA (US); Paul C. Brewer, Arlington, VA (US); Niels Haering, Reston, VA (US); Alan J. Lipton, Austin, TX (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 100 days.

(21) Appl. No.: 15/800,824

(22) Filed: Nov. 1, 2017

(65) Prior Publication Data

US 2018/0070075 A1 Mar. 8, 2018

Related U.S. Application Data

(62) Division of application No. 13/781,240, filed on Feb. 28, 2013, now abandoned, which is a division of application No. 12/188,801, filed on Aug. 8, 2008, now Pat. No. 8,405,720.

(51) Int. Cl.
*H04N 17/00* (2006.01)
*G08B 13/196* (2006.01)

(52) U.S. Cl.
CPC ....... *H04N 17/002* (2013.01); *G08B 13/1963* (2013.01)

(58) Field of Classification Search
CPC .................... H04N 17/002; G08B 13/1963
USPC ............................. 348/143, 207.99
See application file for complete search history.

(56) References Cited

U.S. PATENT DOCUMENTS

| 5,802,412 | A | 9/1998 | Kahn |
| 7,176,960 | B1 | 2/2007 | Nayar et al. |
| 7,463,783 | B1 | 12/2008 | Dugan et al. |
| 7,633,547 | B2 | 12/2009 | Watanabe et al. |
| 8,049,779 | B2 | 11/2011 | Poulin et al. |
| 8,405,720 | B2 | 3/2013 | Gupta et al. |
| 2002/0057348 | A1* | 5/2002 | Miura ............... H04N 5/232 348/211.4 |
| 2002/0109710 | A1* | 8/2002 | Holtz ............... G06F 3/1431 715/723 |
| 2005/0007477 | A1 | 1/2005 | Ahiska et al. |
| 2008/0025593 | A1* | 1/2008 | Ajioka ............ G06K 9/00234 382/141 |
| 2008/0101789 | A1* | 5/2008 | Sharma ............... G03B 17/00 396/427 |
| 2008/0129825 | A1* | 6/2008 | DeAngelis ......... A63B 24/0021 348/169 |
| 2009/0219387 | A1 | 9/2009 | Marman et al. |
| 2010/0169410 | A1* | 7/2010 | Lund ............... G08B 13/19656 709/203 |
| 2012/0038776 | A1 | 2/2012 | Ahiska et al. |
| 2013/0176432 | A1 | 7/2013 | Gupta et al. |

\* cited by examiner

*Primary Examiner* — Alan S Chou
(74) *Attorney, Agent, or Firm* — MH2 Technology Law Group, LLP

(57) ABSTRACT

A method to determine a base focal length of a pan-tilt-zoom (PTZ) camera system. The method includes generating a spherical mosaic with a feature track by the camera system and determining, by the camera system, a base focal length by analyzing a conic trajectory created by the feature track on an image plane.

16 Claims, 34 Drawing Sheets

AUTOMATIC CALIBRATION OF PTZ CAMERA SYSTEM

CROSS-REFERENCE TO RELATED APPLICATIONS

This application is a Divisional of U.S. patent application Ser. No. 13/781,240, filed Feb. 28, 2013, which is a Divisional of U.S. patent application Ser. No. 12/188,801, filed on Aug. 8, 2008, now U.S. Pat. No. 8,405,720, the contents of which are hereby incorporated by reference herein in their entireties.

FIELD OF THE INVENTION

The present invention is directed to a system and method for automatically acquiring the calibration parameters of a PTZ camera.

BACKGROUND OF INVENTION

Video-based security systems are commonly employed by businesses and other facilities, such as banks, stores and airports. Video-based security systems utilize a sensing device, such as a video camera, to obtain and record images within the video camera's field-of-view. The images recorded by the video camera may be monitored by a human operator, either in real-time or on a delay, and/or stored for future use.

In an effort to keep costs down, many security systems are designed to utilize a small number of wide angle video cameras. However, while stationary camera systems provide a wide coverage area, they typically do not capture high resolution images.

An alternative to the wide angle video camera system is an active camera system. An active camera system may utilize a small number of pan-tilt-zoom (PTZ) cameras that can operate in a wide-angle mode or a PTZ mode. An active camera system may use one or more individual cameras which operate in a wide-angle mode, until a target of interest is detected, and then may automatically switch to a PTZ mode. Once in PTZ mode the PTZ camera may zoom in and/or track the target as long as it remains in the camera's direct line of sight. While in PTZ mode, the PTZ camera may be able to capture high resolution images of the target.

Calibration of the PTZ camera is an important step in ensuring proper operation of an active camera system. Once the PTZ camera is calibrated, the response and stability of a PTZ camera controller can be fine tuned. While manual calibration of the PTZ camera is desirable, it may not always be possible. For example, a deployed camera in need of calibration may be difficult to reach rendering manual calibration impractical.

SUMMARY OF THE INVENTION

In one exemplary embodiment a method calibrates a pan-tilt-zoom (PTZ) camera system. The PTZ camera system may include a PTZ camera. The method may perform at least one of the following steps: determining a radial distortion of the PTZ camera; determining a base focal length of the PTZ camera; determining a zoom and magnification profile of the PTZ camera; determining an actuation delay of the PTZ camera system; determining a pan position mode speed and/or a tilt position mode speed of the PTZ camera; determining a pan velocity profile and/or a tilt velocity profile of the PTZ camera; determining a zoom position profile and/or a zoom duration profile of the PTZ camera; determining a query delay of the PTZ camera system; or determining a minimum query interval of the PTZ camera system.

In another exemplary embodiment, a pan-tilt-zoom (PTZ) camera calibration system contains, at least, a PTZ camera and at least a radial distortion engine to determine a radial distortion of the PTZ camera; a base focal length engine to determine a base focal length of the PTZ camera; a zoom and magnification engine for determine a zoom and magnification profile of the PTZ camera; an actuation delay engine to determine an actuation delay of the PTZ camera system; a pan/tilt position mode speed engine to determine a pan position mode speed and/or a tilt position mode speed of the PTZ camera; a pan/tilt velocity engine to determine a pan velocity profile and/or a tilt velocity profile of the PTZ camera; a zoom position and duration engine to determine a zoom position profile and/or a zoom duration profile of the PTZ camera; a query delay engine to determine a query delay of the PTZ camera system; or a minimum query interval engine to determine a minimum query interval of the PTZ camera system.

In another exemplary embodiment, a computer-readable medium stores computer-executable instructions. The medium may hold: one or more instructions for determining a radial distortion of a PTZ camera; one or more instructions for determining a base focal length of the PTZ camera; one or more instructions for determining a zoom and magnification profile of the PTZ camera; one or more instructions for determining an actuation delay of the PTZ camera system; one or more instructions for determining a pan position mode speed and/or a tilt position mode speed of the PTZ camera; one or more instructions for determining a pan velocity profile and/or a tilt velocity profile of the PTZ camera; one or more instructions for determining a zoom position profile and/or a zoom duration profile of the PTZ camera; one or more instructions for determining a query delay of the PTZ camera system; or one or more instructions for determining a minimum query interval of the PTZ camera system.

BRIEF DESCRIPTION OF THE DRAWINGS

The foregoing and other features of exemplary embodiments described herein will be apparent front the following description as depicted in the accompanying drawings wherein like reference numbers generally indicate identical, functionally similar, and/or structurally similar elements.

FIG. 20 depicts an exemplary image in which radial distortion has not been compensated for and an exemplary image in which radial distortion has been compensated for.

DETAILED DESCRIPTION OF VARIOUS EMBODIMENTS OF THE INVENTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

Figure 1:
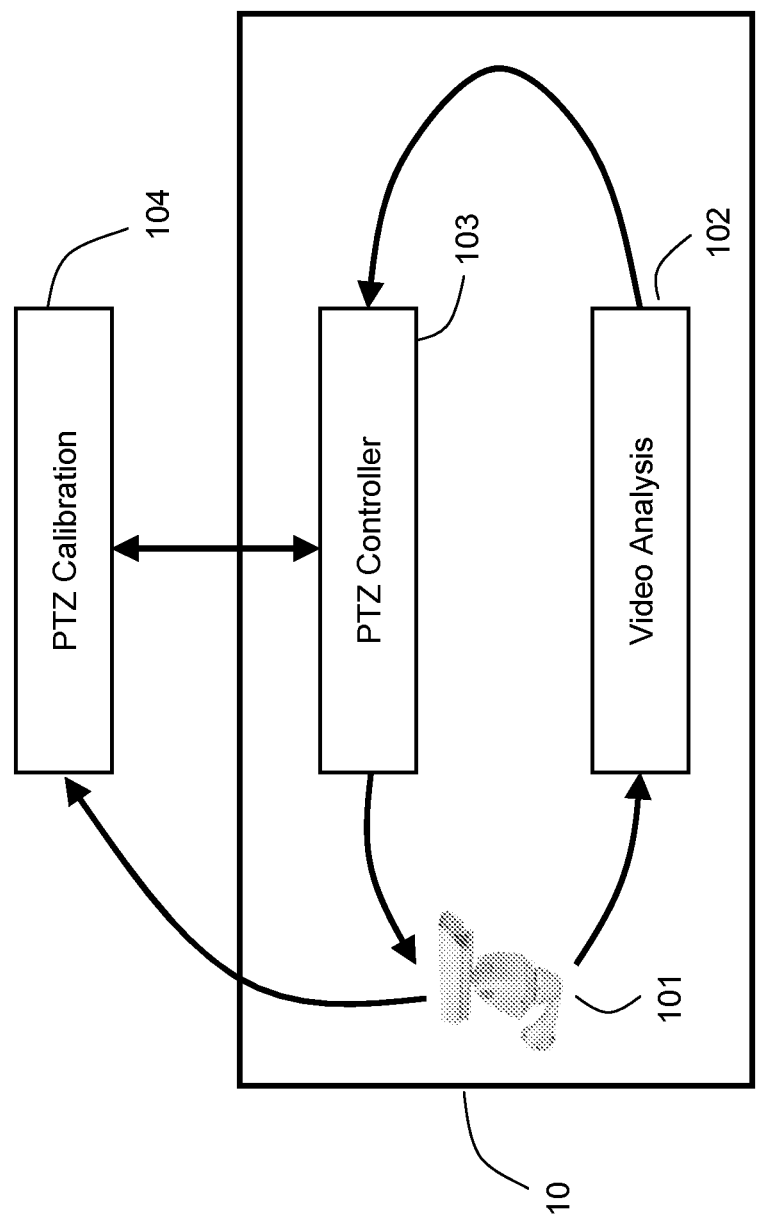
FIG. 1 depicts an exemplary active camera system.

Embodiments of the invention may comprise part of an active camera system. A potential embodiment of an active camera system is depicted in FIG. 1. FIG. 1 depicts an exemplary active camera system having a closed, active, camera-control feedback loop 100 containing, for example, a PTZ camera 101, a video-analysis module 102, and a PTZ controller module 103. PTZ camera 101 may provide video frames to the video-analysis module 102 or the PTZ calibration module 104. The video-analysis module 102 may analyze the incoming frames, identify a target to be tracked, and determine the location of the target in the frame. The video analysis module 102 may determine the location of the target to be tracked by utilizing computer vision techniques. Exemplary computer vision techniques are motion estimation, motion compensation, foreground segmentation, feature extraction, target detection, and target tracking.

Continuing with FIG. 1, once the video-analysis module 102 determines the location of the target to be tracked, the video-analysis module 102 may output information to the PTZ controller module 103. The PTZ controller 103 may also receive information from the PTZ calibration module 104, which is discussed further below. The PTZ controller 103 may use information from the PTZ calibration module 104 to translate information input from the video-analysis module 102 into executable commands for the PTZ camera 101. The PTZ controller 103 may then output commands to the PTZ camera 101 which may enable the PTZ camera 101 to track the target at an appropriate resolution.

Figure 2:
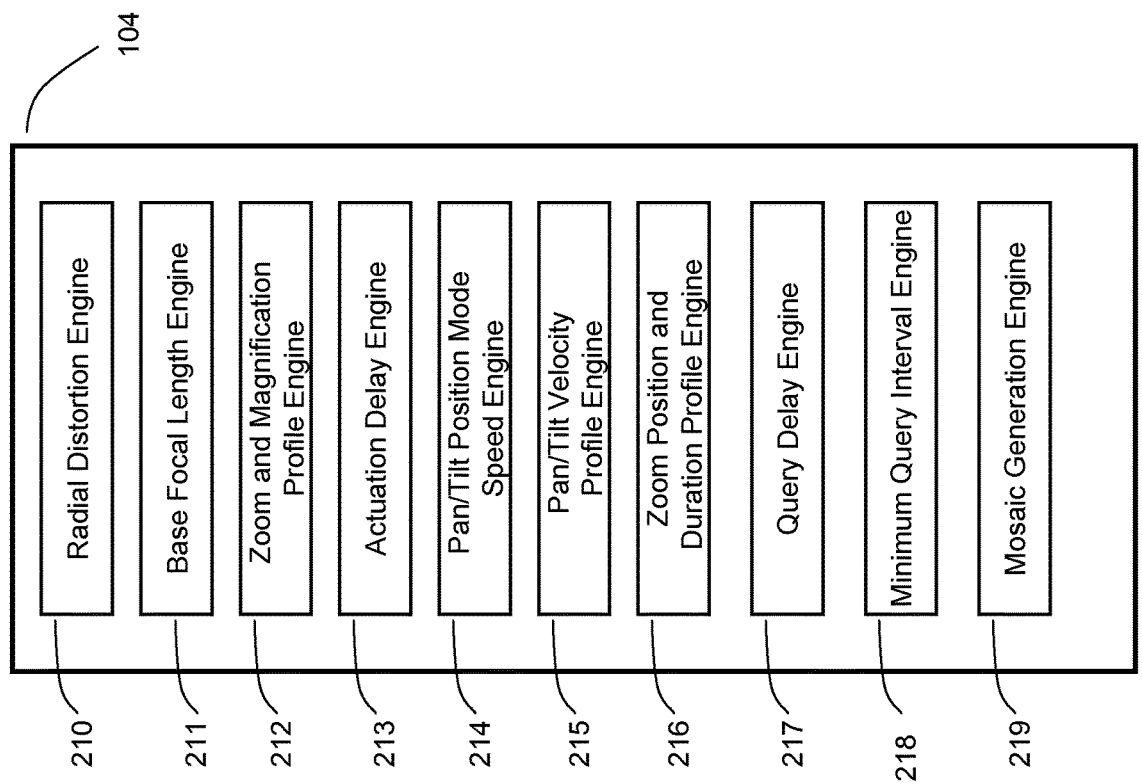
FIG. 2 depicts an exemplary the PTZ calibration module.
Figure 3:
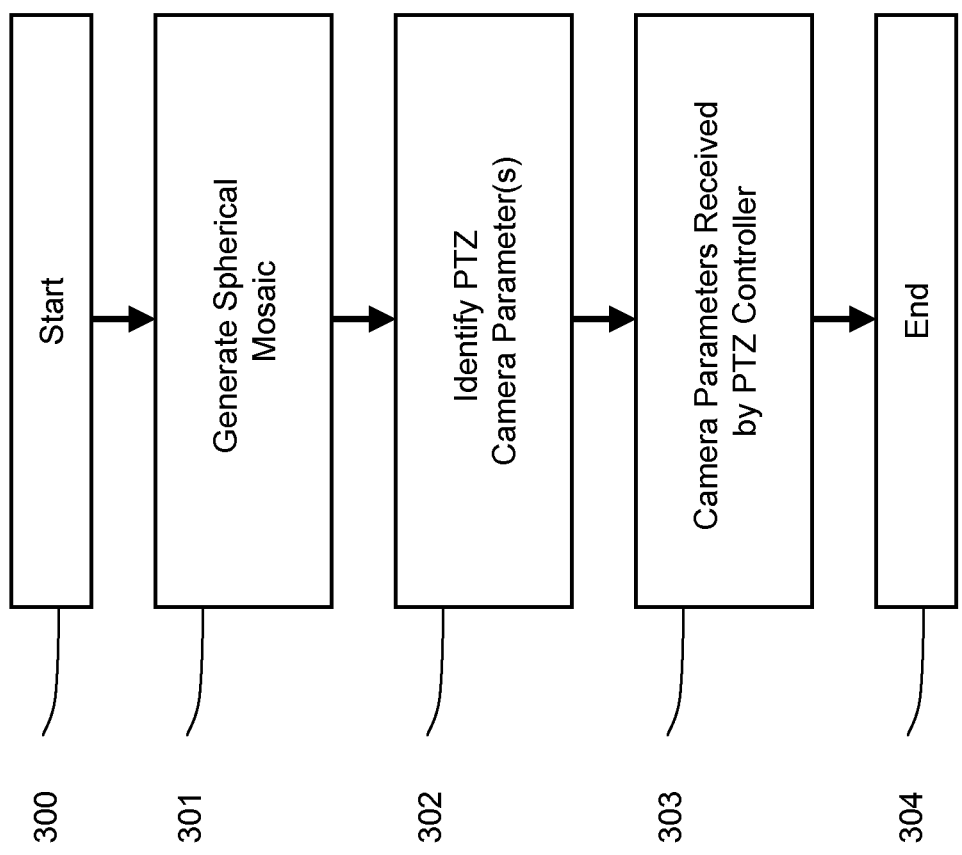
FIG. 3 depicts a flow chart for an exemplary technique by which a PTZ camera may be calibrated using information obtained by the PTZ calibration module.

FIG. 2 depicts an exemplary embodiment of the PTZ calibration module 104. The PTZ calibration module 104 may determine at least one of the PTZ camera's parameters based on images received from the PTZ camera 101, information sent to the PTZ controller 103, and/or information received from the PTZ controller 103. The PTZ calibration module 104 may contain at least one of the following parameter estimation engines, where each is discussed in detail below, in no particular order: a radial distortion engine 210 which may determine a PTZ camera's radial distortion, a base focal length engine 211 which may determine a PTZ camera's base focal length, a zoom/magnification profile engine 212 which may determine a PTZ camera's zoom/magnification profile, an actuation delay engine 213 which may determine a PTZ camera's actuation delay, a pan/tilt position mode speed engine 214 which may determine a PTZ camera's pan position and/or tilt position mode speed, a pan/tilt velocity profile engine 215 which may determine a PTZ camera's pan velocity and/or tilt velocity profile, a zoom position and duration profile engine 216 which may determine a PTZ camera's zoom position and/or duration profile, and a query delay engine 217 which may determine a PTZ camera's query delay, a minimum query interval engine 218 which may determine a PTZ camera's minimum query interval, and/or a mosaic generation engine 219. These engines may be arranged in any order within the PTZ calibration module 104. FIG. 3 depicts a flow chart for an exemplary technique by which a PTZ camera may be calibrated using information obtained by the PTZ calibration module 104, discussed above in connection with FIG. 2. The exemplary technique may begin in block 300 and may continue onto block 301. In block 301, a spherical mosaic may be generated based on images received from the PTZ camera. In block 302, at least one of the PTZ camera's parameters are identified by the PTZ calibration module 104. Exemplary parameters of a PTZ camera may be the base focal length, the zoom and magnification profile, the radial distortion, actuation delay, pan/tilt position mode speed, pan/tilt velocity profile, zoom position, zoom duration, query delay, and/or minimum query interval. Each of these parameters is discussed in greater detail below. In block 303, the PTZ camera parameters may be received by the PTZ controller 103. The PTZ controller 103 may then use all or part of the information obtained by the PTZ calibration module 104 to control the PTZ camera. In block 304, the process may end.

Mosaic Building

Prior to estimating an exemplary PTZ camera's 101 base focal length with the base focal length engine 211 and/or radial distortion with the radial distortion engine 210, a mosaic image may be generated by the mosaic generation engine 219. Mosaic generation engine 219 may generate a mosaic image in which consecutive frames, captured by the PTZ camera 101, may be combined to form an overall panoramic image of a scene.

Figure 4:
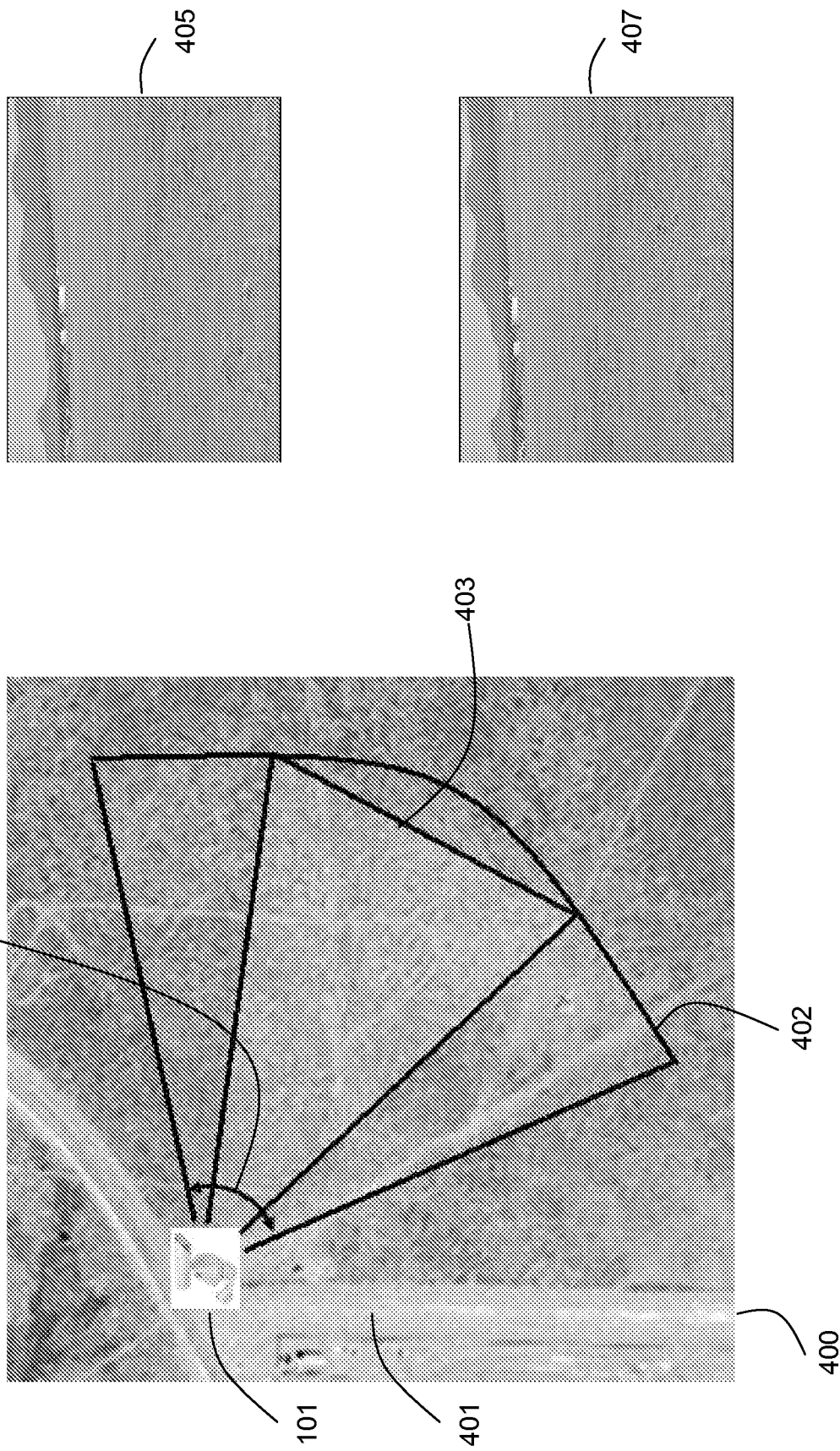
FIG. 4 depicts an exemplary PTZ camera's overall field of view.

FIG. 4 depicts an exemplary PTZ camera's 101 overall field of view. In FIG. 4, a PTZ camera 101 may be positioned in deployment site 401. As the PTZ camera 101 moves back and forth along directional arrow A the instantaneous field of view 403 for each frame 405 and 407 of the PTZ camera 101 may be smaller than the PTZ camera's 101 total field of view through the entirety of its scan path 402. However, by combining individual video frames 405 and 407 together spatially, a single, mosaic image of the camera's entire viewable area may be obtained. Exemplary techniques of combining individual video frames 405 and 407 together to form a mosaic image are discussed below.

Figure 5:
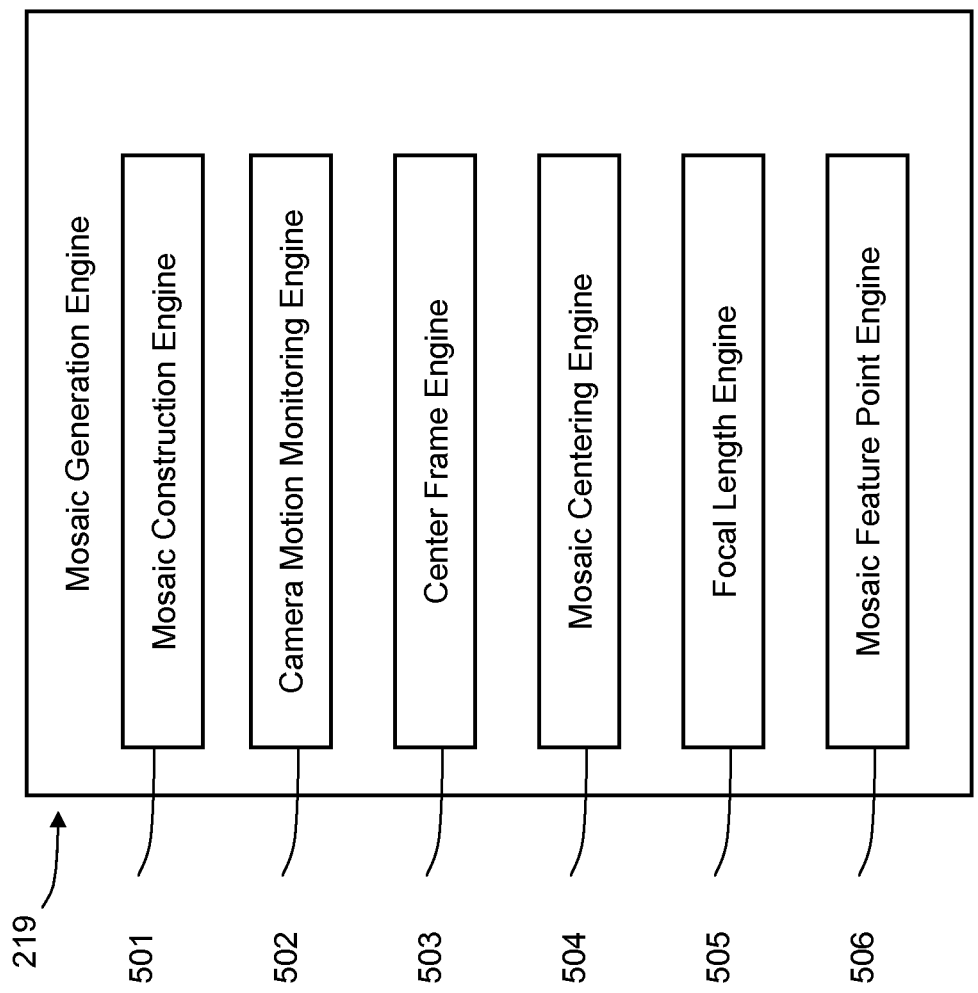
FIG. 5 depicts an exemplary embodiment of a mosaic generation engine.

FIG. 5 depicts an exemplary embodiment of a mosaic generation engine 219. The mosaic generation engine 219 may generate a mosaic image in which consecutive frames, such as frames 230 and image 231, may be combined to form an overall panoramic image of a scene. Mosaic generation engine 219 may contain, in no particular order, at least one of a mosaic construction engine 501, a camera motion monitoring engine 502, a center frame engine 503, a mosaic centering engine 504, a focal length engine 505, and/or a mosaic feature point engine 506, all of which are described in greater detail below.

Mosaic Construction Engine 501

Referring back to FIG. 5, the mosaic construction engine 501 may construct an exemplary spherical mosaic.

Figure 6:
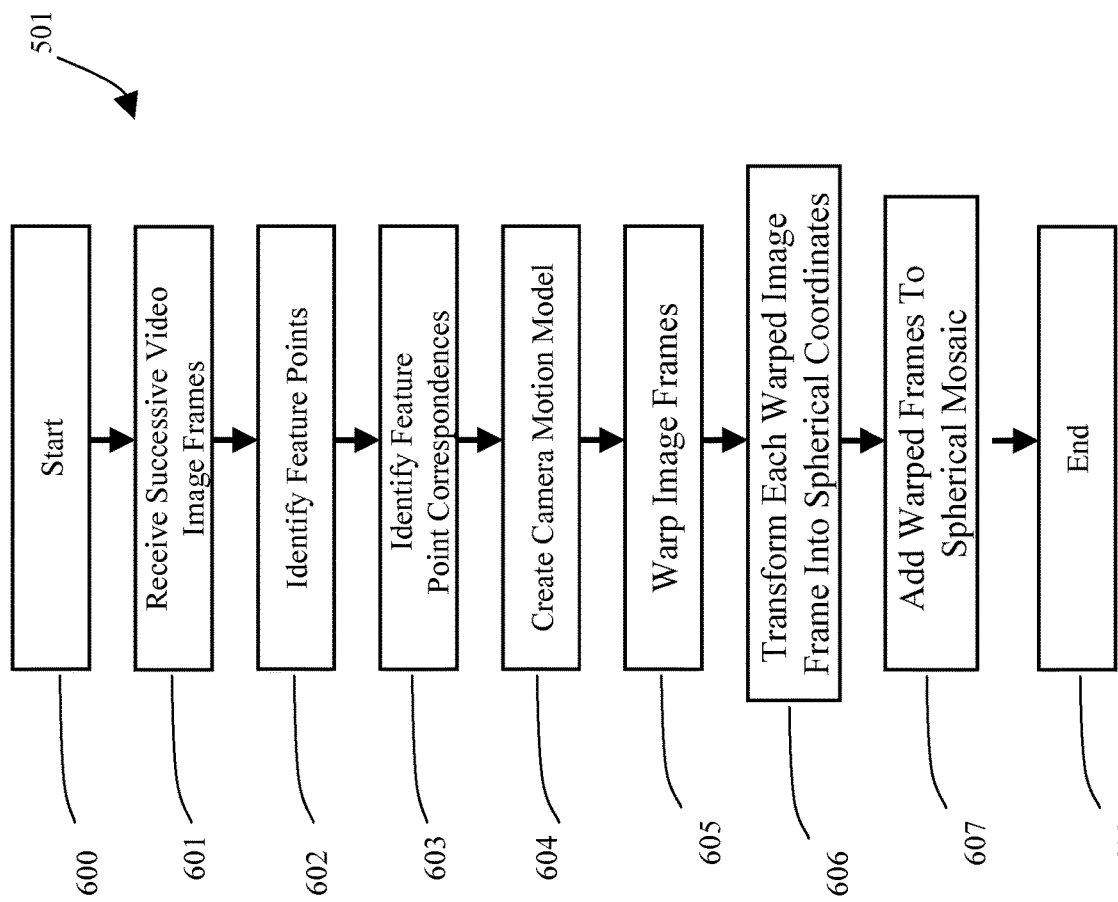
FIG. 6 depicts a flowchart for an exemplary technique by which the mosaic construction engine may create a scene mosaic.

FIG. 6 depicts a flowchart for an exemplary technique by which the mosaic construction engine 501 may create a spherical mosaic. The exemplary technique may begin in block 600 and may continue onto block 601. In block 601, successive video image frames may be received by the mosaic construction engine 501. Each video frame may be expressed in terms of its planar coordinates. In block 602, feature points for each video image frame may be identified by applying a Laplacian feature detector to each image frame. In block 603, feature point correspondences may be identified between successive image frames using the identified feature points from each image. In block 604, a camera motion model may be created. The camera motion model may be based on a homography between successive image frames. The homography may be based on the identified feature points and/or the identified feature point correspondences. In block 605, each image frame may be warped based on the camera motion model and/or the identified feature point correspondences. In block 606, each warped image may be transformed from planar coordinates to spherical coordinates. In block 607, the successive, warped image frames, expressed in spherical coordinates, may be added to a spherical mosaic. In block 608, the exemplary technique may end. In addition, blocks 601-607 are described in, for example, U.S. patent application Ser. No. 11/220,970 "Scanning Camera Based Video Surveillance System," which is incorporated herein by reference.

Figure 7:
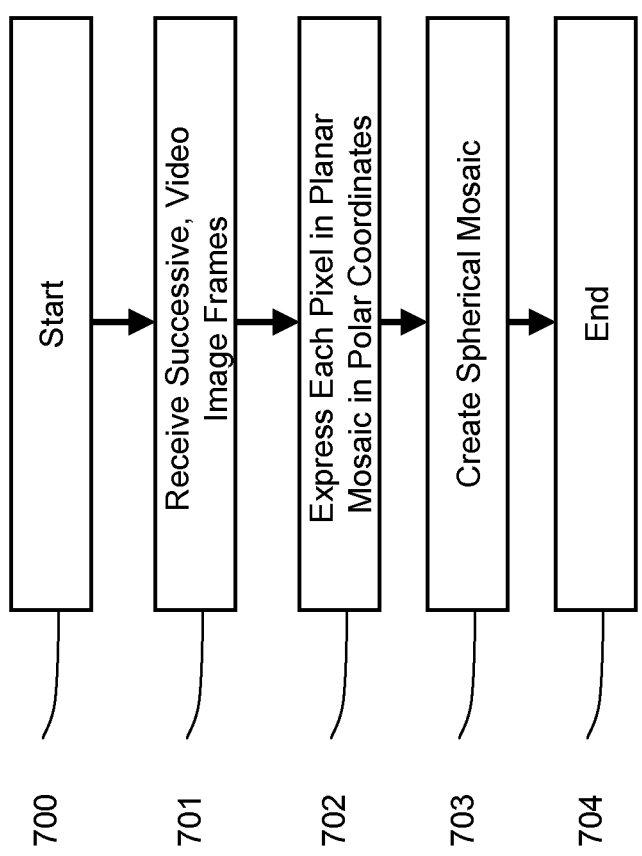
FIG. 7 depicts a flowchart for an exemplary mosaic construction technique.
Figure 8:
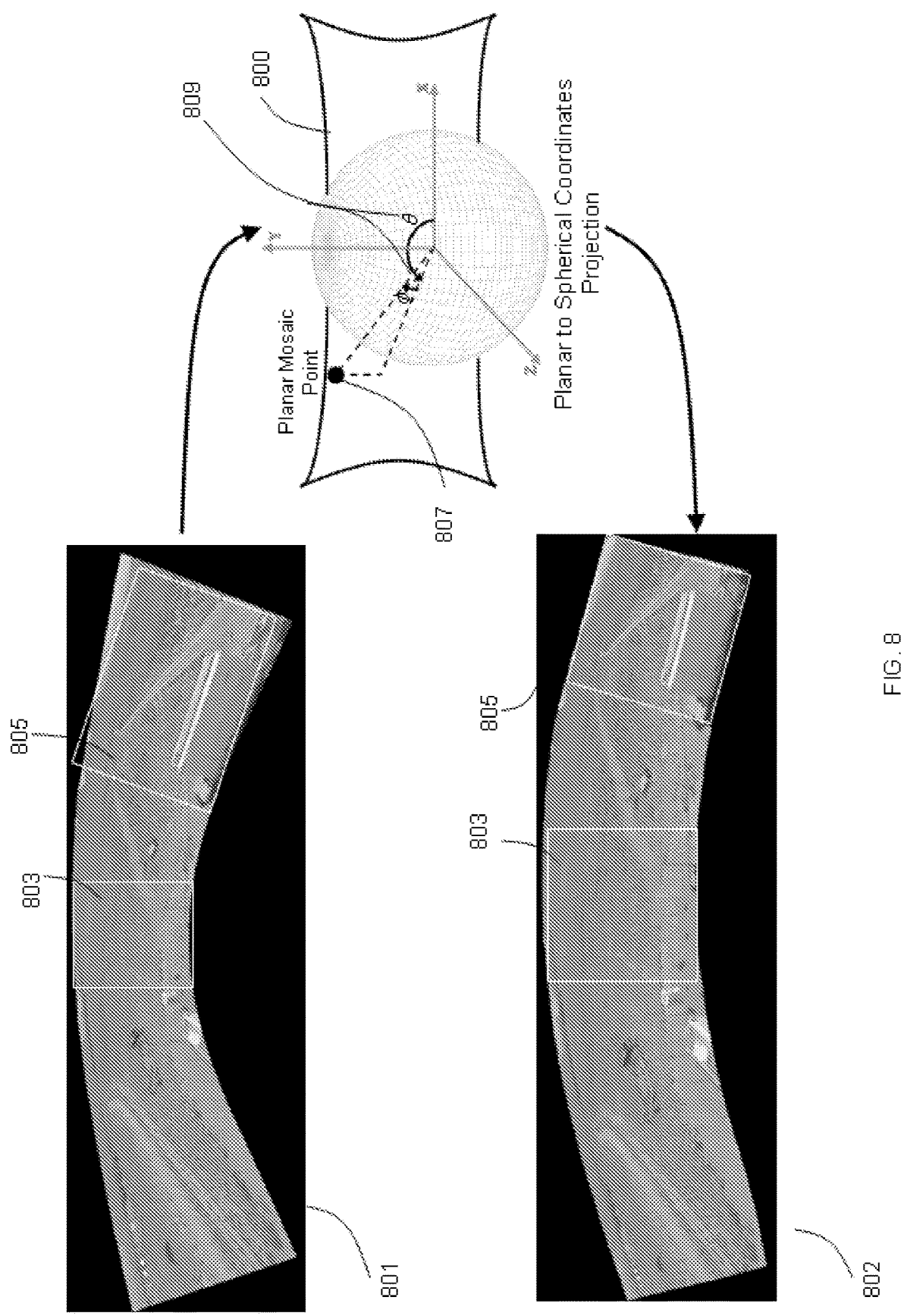
FIG. 8 depicts an exemplary mosaic construction technique.
Figure 9:
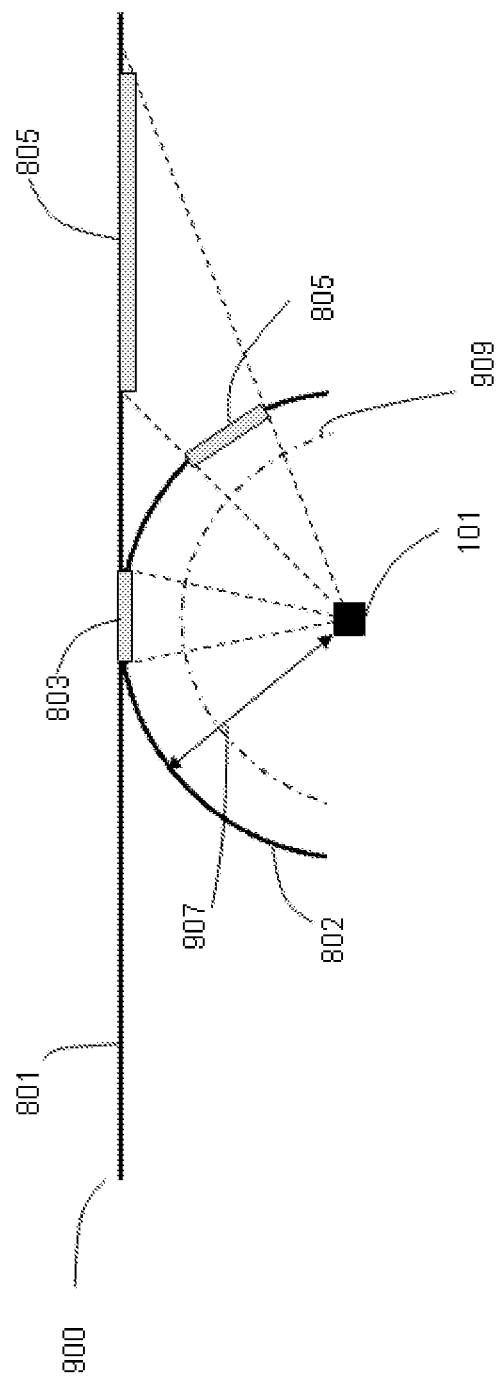
FIG. 9 depicts an exemplary mosaic construction technique.

FIG. 7 depicts a flowchart for an exemplary technique by which the mosaic construction engine 501 may transform a warped image frame form planar coordinates to spherical coordinates, as in block 606 above. FIG. 7 is explained using FIGS. 8 and 9 as examples. FIGS. 8 and 9 depict an exemplary mosaic construction technique according to an exemplary embodiment of the mosaic construction engine 501.

The exemplary technique of FIG. 7 may begin in block 700 and continue onto block 701. In block 701, exemplary successive, video image frames may be received by the mosaic construction engine 501, as in block 601 above. In FIGS. 8 and 9, as PTZ camera 101, with focal length 907, moves along scan path 909, image frames 803 and 805 may be captured. When mapped onto exemplary planar mosaic 801, frame 803 may be minimally distorted. However, when mapped onto exemplary planar mosaic 801, frame 805, may be extended when compared to frame 803. The extension of frame 805 on the exemplary planar mosaic may be referred to as perspective distortion. The perspective distortion of image frame projected onto a planar mosaic produces a distortion at the four corners of exemplary planar mosaic 801. These distortions may introduce inaccuracies during the estimation of the PTZ camera's 101 focal length, zoom steps-magnification profile, radial distortion, actuation delay, pan/tilt position mode speed, pan/tilt velocity profile, zoom position/duration profile, query delay, and/or minimum query interval.

Continuing with FIG. 7, in order to prevent perspective distortion, in block 702, each pixel may be expressed in terms of their polar coordinates $(\theta, \phi)$. In FIG. 8, exemplary pixel 807 may be expressed in terms of its polar coordinates 809. In block 703, each pixel may be mapped onto a spherical mosaic using each pixel's polar coordinates. In FIGS. 8 and 9, frames 803 and 805 may be mapped onto spherical mosaic 802. Mapping each pixel onto a spherical surface at the PTZ camera's focal length 907 may produce an image, relatively free of perspective distortion, which can be used for more accurate estimation of the PTZ camera's 101 focal length, zoom steps-magnification profile, radial distortion, actuation delay, pan/tilt position mode speed, pan/tilt velocity profile, zoom position/duration profile, query delay and/or minimum query interval.

Camera Motion Monitoring Engine 502

Referring back to FIG. 5, the mosaic generation engine 219 may finish constructing a mosaic once the camera motion monitoring engine 502 determines that the first scan has been completed.

Figure 10:
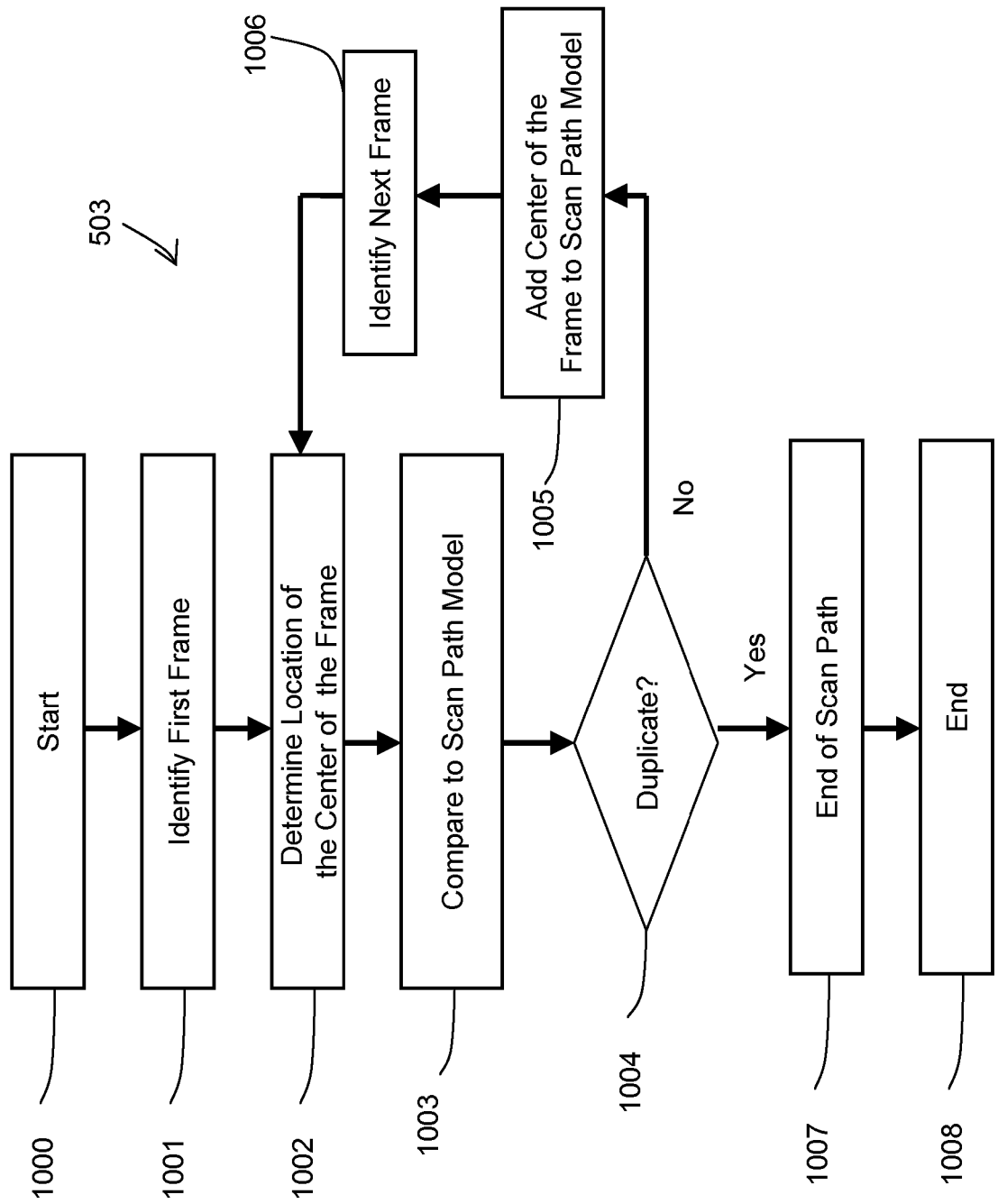
FIG. 10 depicts a flowchart for an exemplary technique by which the camera motion engine may determine that the first scan path has been completed.

FIG. 10 depicts a flowchart for an exemplary technique by which the camera motion engine 502 may determine that a first scan path has been completed. The exemplary technique may begin in block 1000 and may continue onto block 1001. In block 1001, a first frame may be identified. In block 1002, the location of the center of the identified frame may be determined. The center of the identified frame may be determined from a frame motion estimate. In block 1003, the location of the center of the frame may be compared to the scan path model. The scan path model may be a cumulative history of the center point for each frame in a scan path. In decision block 1004, if the location of the center of the identified frame duplicates a location already stored in the scan path model, the identified frame is determined to be a duplicate. In block 1007, if the location of the center of the frame is a duplicate, the camera motion engine 503 may determine that the camera has completed the scan path. In block 1108, the process may end.

Continuing with FIG. 10, if the location of the center of the frame is not found to be a duplicate of a location already in the scan path model in decision block 1004, the process may continue onto block 1005. In block 1005, the location of the center of the frame may be added to the scan path model. In block 1006, the camera motion engine 503 identifies the next frame. Blocks 1002-1004 may then be repeated until a duplicate center point is identified.

Camera motion estimation is a fairly mature technology, and many techniques exist that perform well under most cases. An exemplary technique of camera motion estimation is described in U.S. patent application Ser. No. 11/220,970, filed on Sep. 8, 2005.

Center Frame Engine 503

Referring back to FIG. 5, once the camera motion monitoring engine 502 has determined that the PTZ camera's first scan path has been completed, center frame engine 503 may estimate the center frame of the scan path, which may or may not be the first frame of a scan path.

Figure 11:
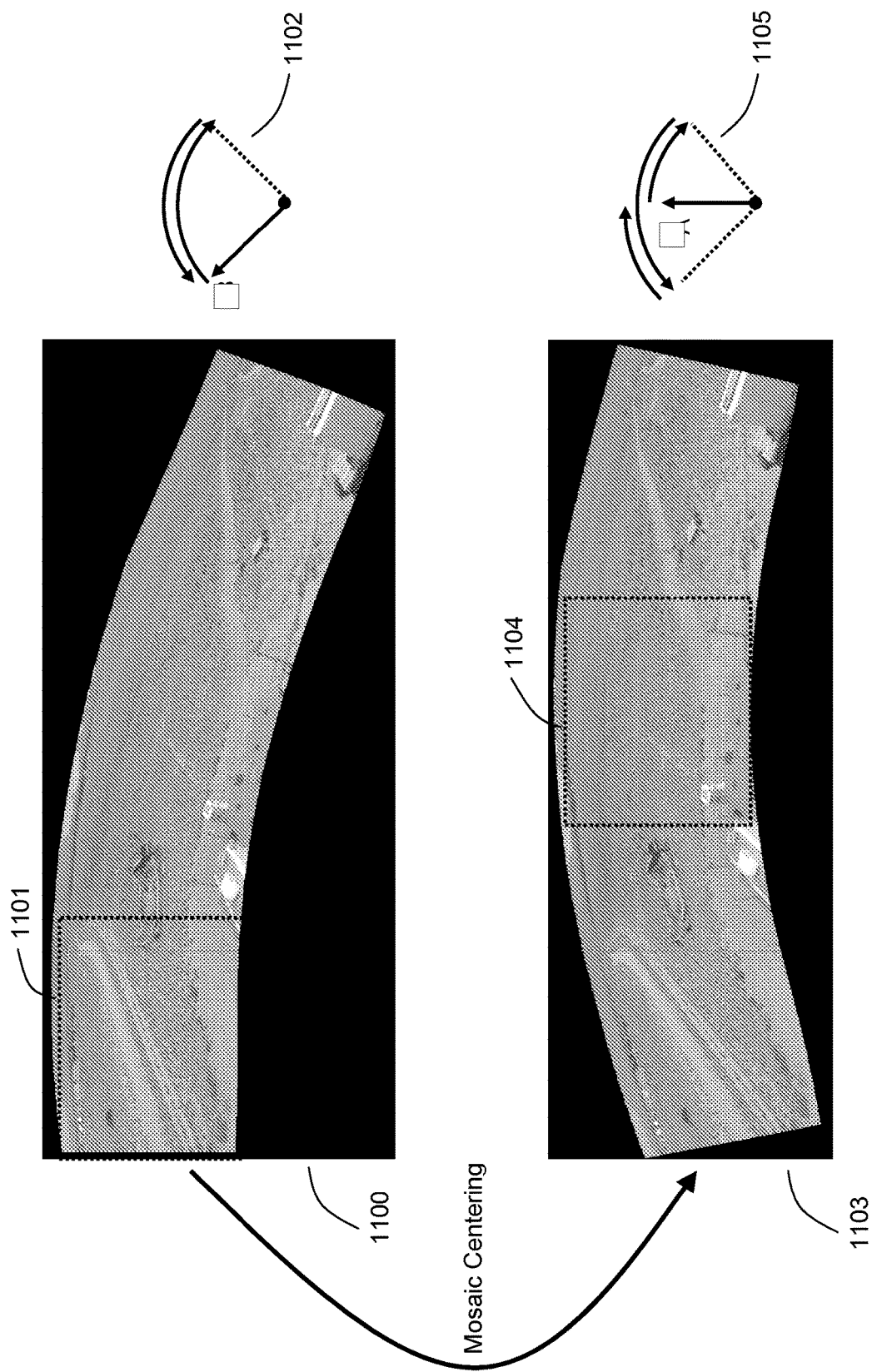
FIG. 11 depicts an exemplary, non-centered mosaic and an exemplary centered mosaic.

FIG. 11 depicts an exemplary, non-centered mosaic 1100 and an exemplary centered mosaic 1103. The non-centered mosaic 1100 was constructed without the aid of the center frame engine 503, described below, and under the assumption that the first frame received from the camera, frame 1101, was the center frame for scan path 1102. As a result, the mosaic was not centered properly. The centered mosaic 1103 was constructed in a similar manner however the first frame received from the camera, frame 1104, happened to be the center frame for scan path 1105.

Figure 12:
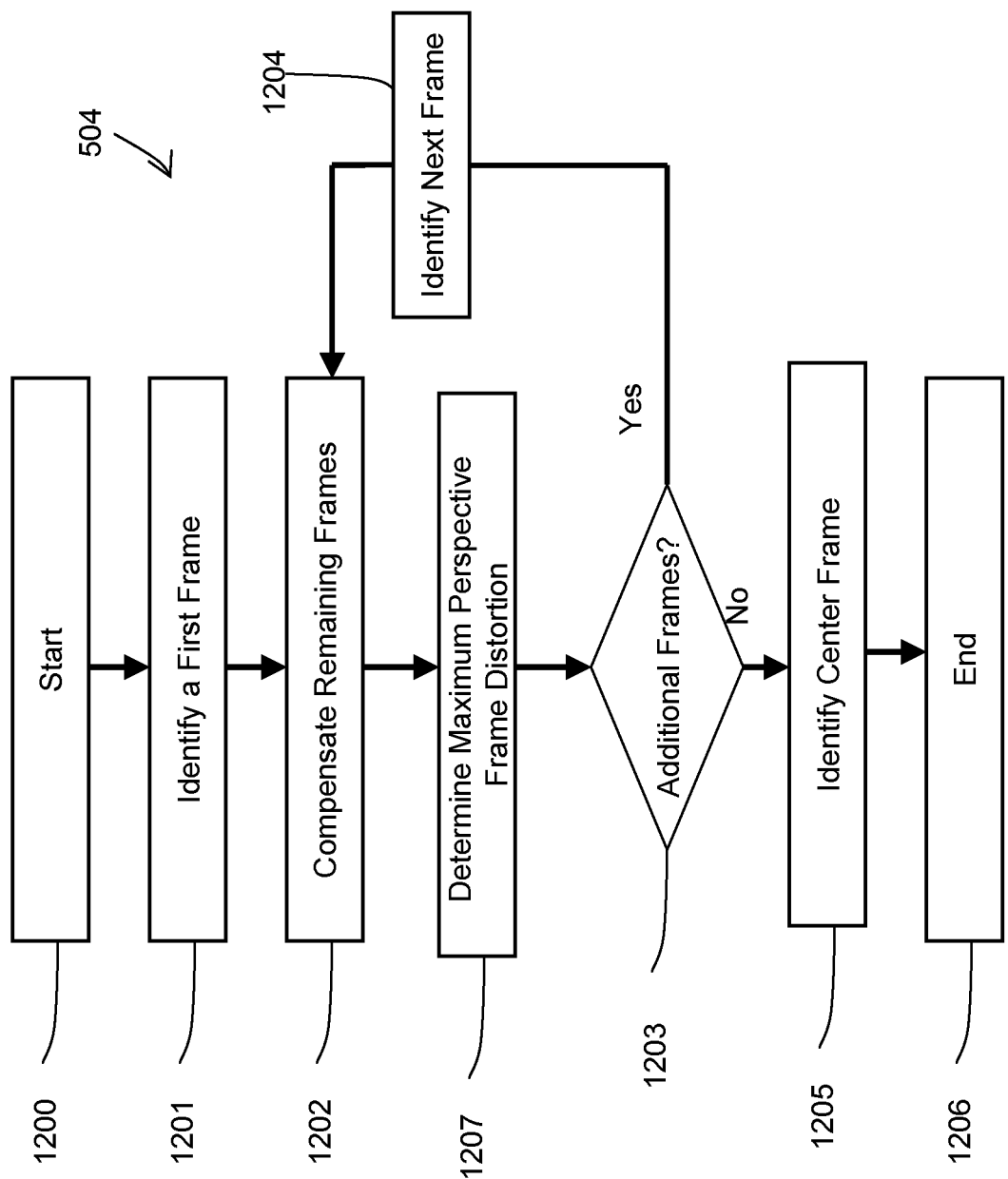
FIG. 12 depicts a flowchart for an exemplary technique by which the center frame engine may identifying the center frame of a scan path and center the mosaic.
Figure 13:
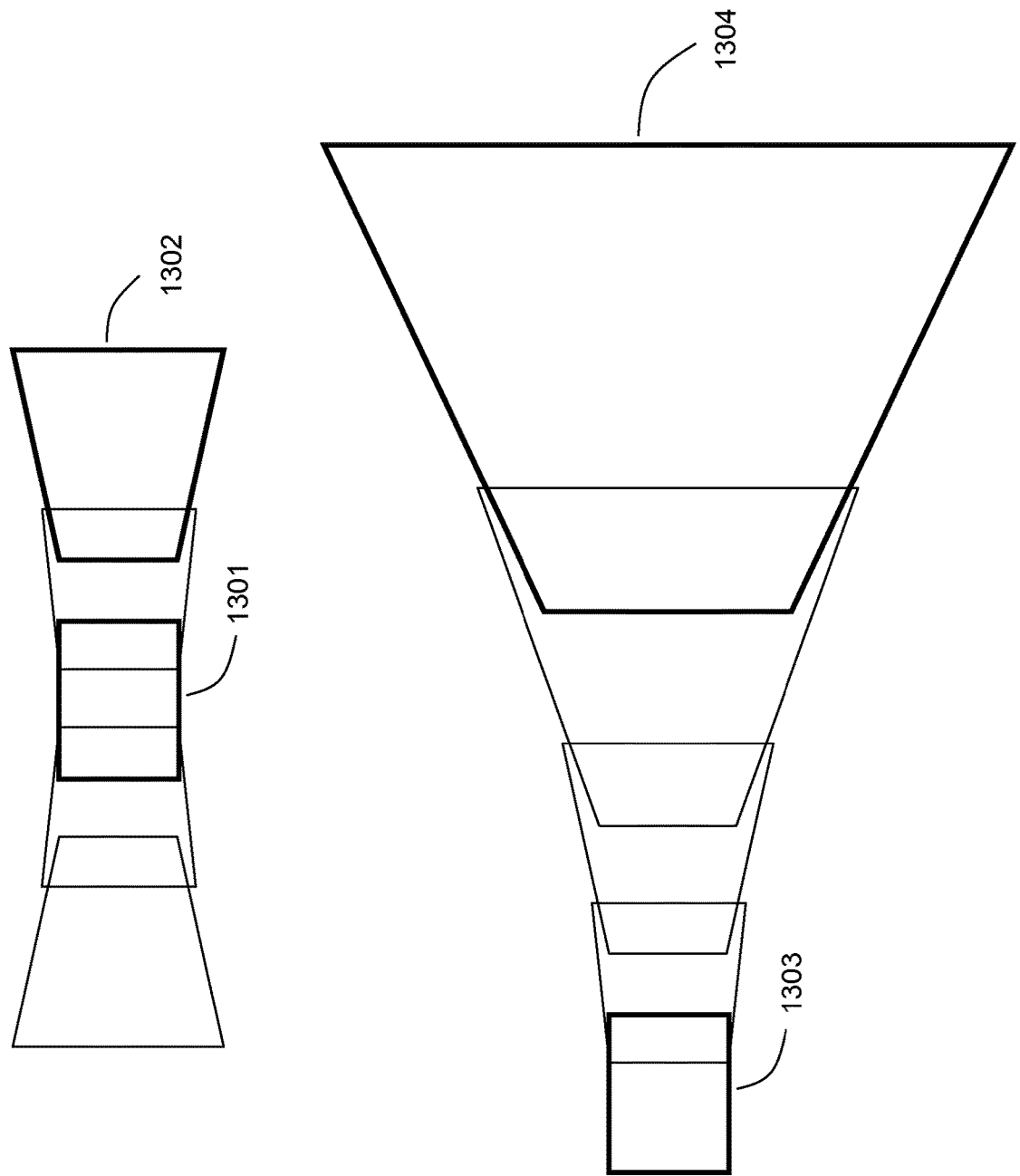
FIG. 13 depicts exemplary, centered mosaics.

FIG. 12 depicts a flowchart for an exemplary technique by which the center frame engine 503 may identify the actual center frame in a scan path and center the mosaic. FIG. 12 is explained using FIG. 13 and as an example. FIG. 13 depicts exemplary, centered mosaics.

In FIG. 12, the exemplary technique may begin in block 1200. In block 1201, a first frame may be identified and temporarily assumed to be the center frame (with motion estimate Mc). In FIG. 13, frame 1301 may be temporarily assumed to be the center frame. In block 1202, the remaining frames may be appropriately compensated (by applying a matrix transformation of $Mc^{-1}$) such that the motion estimate of the center frame may be an identity transformation. In FIG. 13, remaining frame 1302 may be appropriately compensated. In block 1203, the maximum perspective frame distortion may be calculated by dividing the area of the remaining frame with the largest area by the area of the frame assumed to be the center frame. In FIG. 13, the area of frame 1302 may be divided by the area of frame 1301. In block 1204, the technique may continue onto block 1207, if additional frames are detected, or block 1205, if no additional frames are detected. In FIG. 13, additional frames 1303 and 1304 may be identified. In block 1207, if additional frames were detected in block 1204, the next frame may be identified and the process may repeat blocks 1202-1204. In FIG. 13, frame 1303 may be temporarily assumed to be the center frame. Frame 1304 may then be appropriately compensated and the maximum perspective frame distortion may be calculated by dividing the area of frame 1304 by the area of frame 1303. If no additional frames are detected in block 1204, the process may continue onto block 1205. In block 1205, the center frame may be identified. The center frame may be identified as the frame which minimizes the maximum perspective frame distortion among all processed frames. In FIG. 13, the maximum perspective frame distortion between frames 1301 and 1302 is smaller than the maximum perspective frame distortion between frames 1303 and 1304. The center frame may, therefore, be identified as frame 1301. In block 1206, the exemplary technique may end.

Mosaic Centering Engine 504

Referring back to FIG. 5, the mosaic generation engine 219 may finish constructing a mosaic once the mosaic centering engine 504 centers an exemplary mosaic.

Figure 14:
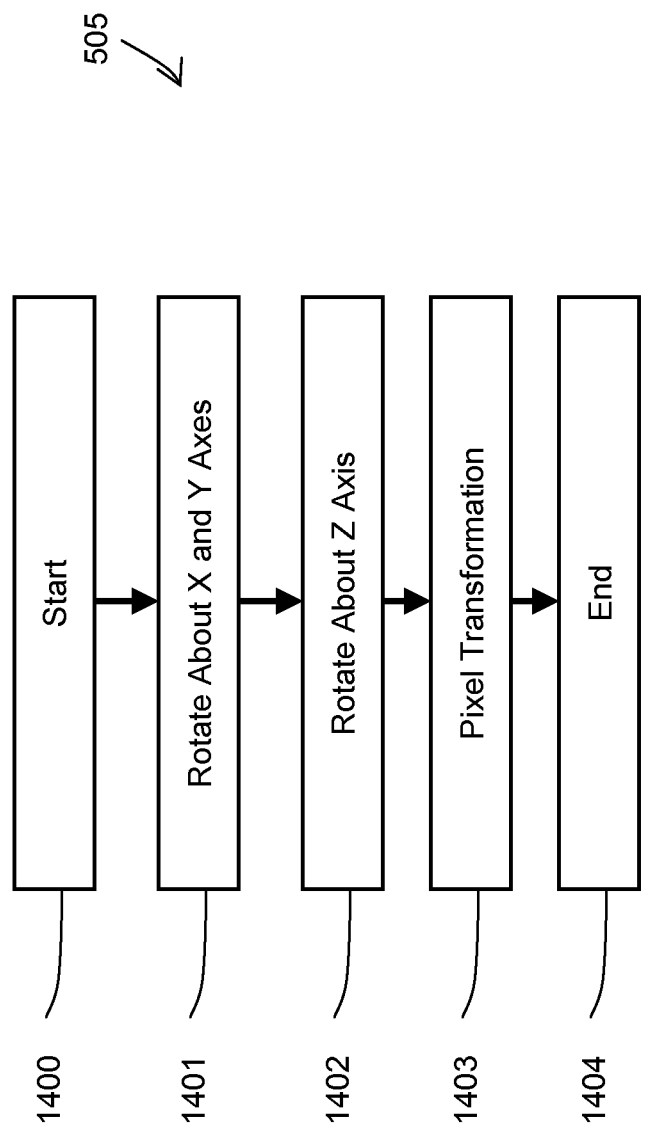
FIG. 14 depicts a flowchart for an exemplary technique by which the mosaic centering engine may center an exemplary mosaic.
Figure 15:
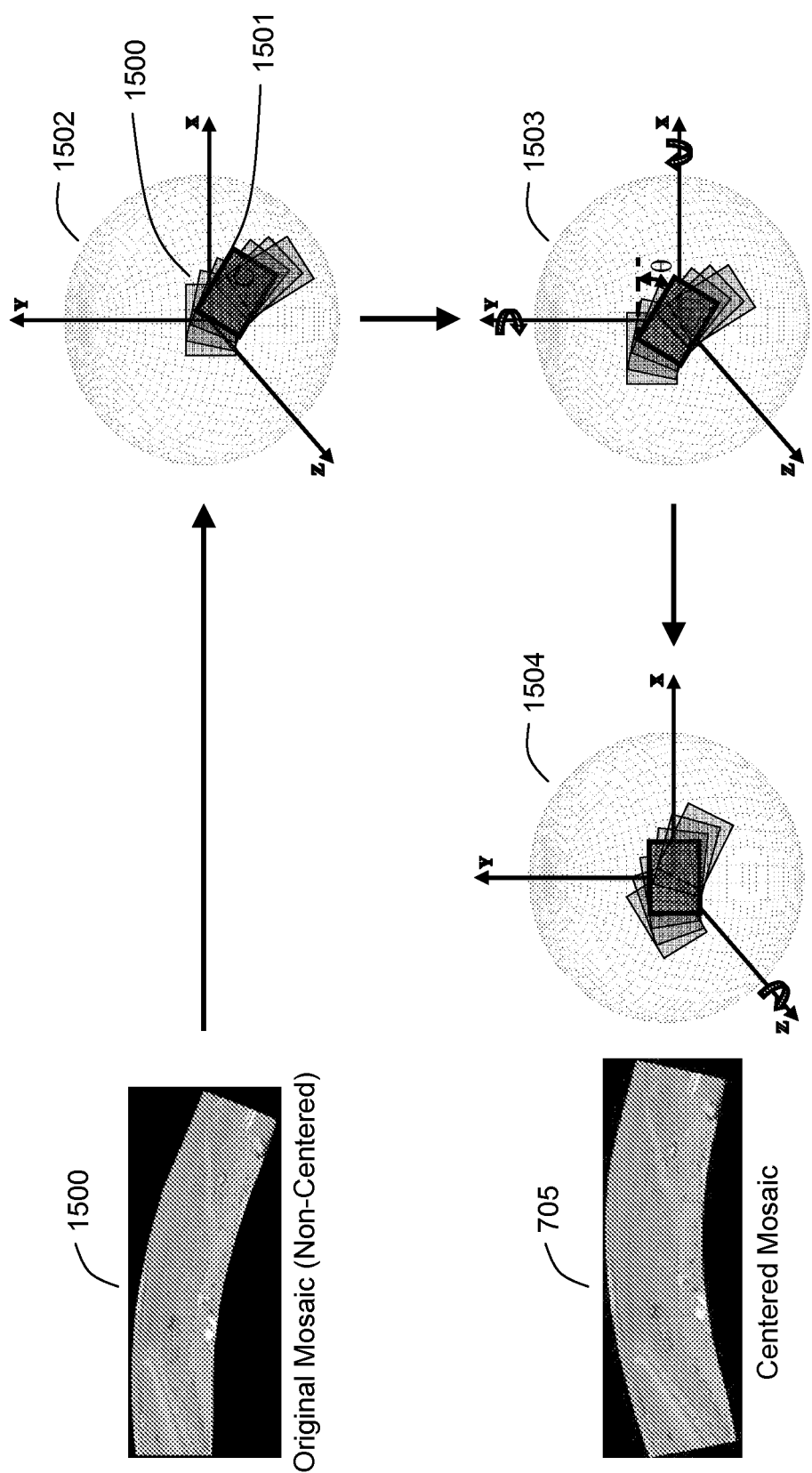
FIG. 15 depicts an exemplary centering operation.

FIG. 14 depicts a flowchart for an exemplary technique by which the mosaic centering engine 504 may center an exemplary mosaic. FIG. 14 is explained using FIG. 15 as an example. FIG. 15 depicts an exemplary centering operation.

Once the center frame has been identified in block 1205 of FIG. 12, the mosaic centering engine 504 may transform each pixel of the image in order to create a centered mosaic image. In block 1400, the technique may begin by identifying a center frame of a non-centered mosaic. In FIG. 15, a non-centered mosaic 1500 may be depicted in sphere 1502 along with the center frame 1501, identified in block 1205 of FIG. 12, whose center may be denoted by C. In block 1401 of FIG. 14, the mosaic centering engine 504 may rotate the mosaic 1500 along the X and Y axes. In FIG. 15, sphere 1502 represent the orientation of the mosaic 1500 before being rotated along X and Y axes. Sphere 1503 may depict the orientation of mosaic 1500 after rotation $R_x$ and $R_y$ along the X and Y axes respectively, where $R_x$ and $R_y$ may equal:

$$R_x = \begin{bmatrix} 1 & 0 & 0 \\ 0 & \frac{\hat{C}_z}{P_{xy}} & \frac{-\hat{C}_y}{P_{xy}} \\ 0 & \frac{\hat{C}_y}{P_{xy}} & \frac{\hat{C}_z}{P_{xy}} \end{bmatrix} \quad R_y = \begin{bmatrix} P_{xy} & 0 & -\hat{C}_x \\ 0 & 1 & 0 \\ \hat{C}_x & 0 & P_{xy} \end{bmatrix}. \quad (1)$$

The unit norm vector from the center of the sphere to the frame center of the estimated center frame may equal:

$$\hat{C} = \frac{C}{\|C\|} = (\hat{C}_x, \hat{C}_y, \hat{C}_z), \quad (1A)$$

and $$P_{xy} = \sqrt{(\hat{C}_x)^2 + (\hat{C}_y)^2}. \quad (1B)$$

In block 1402, the mosaic entering engine 504 may rotate the mosaic 1500 along the Z axis. In FIG. 15, sphere 1503 depicts the orientation of mosaic 1500 before being rotated around the Z axis. Sphere 1504 may depict the orientation of mosaic 1500 after rotation $R_z$ along the Z axis, where:

$$R_z = \begin{bmatrix} \cos(\theta) & \sin(\theta) & 0 \\ -\sin(\theta) & \cos(\theta) & 0 \\ 0 & 0 & 1 \end{bmatrix} \quad (2)$$

and the rotation angle θ, depicted in Sphere 1503, may be the slope of the center frame's top boundaries in relation to the Z axis. In block 1403, the mosaic centering engine 504 may adjust each pixel of the mosaic image using the above transformations to create a centered mosaic image. Mosaic 1505 depicts an exemplary centered mosaic image. In block 1404, the exemplary technique may end.

Focal Length Engine 505

Referring back to FIG. 5, once the camera motion monitoring engine 503 has determined that the PTZ camera's first scan path has been completed, the focal length engine 505 may estimate the PTZ camera's focal length.

Figure 16:
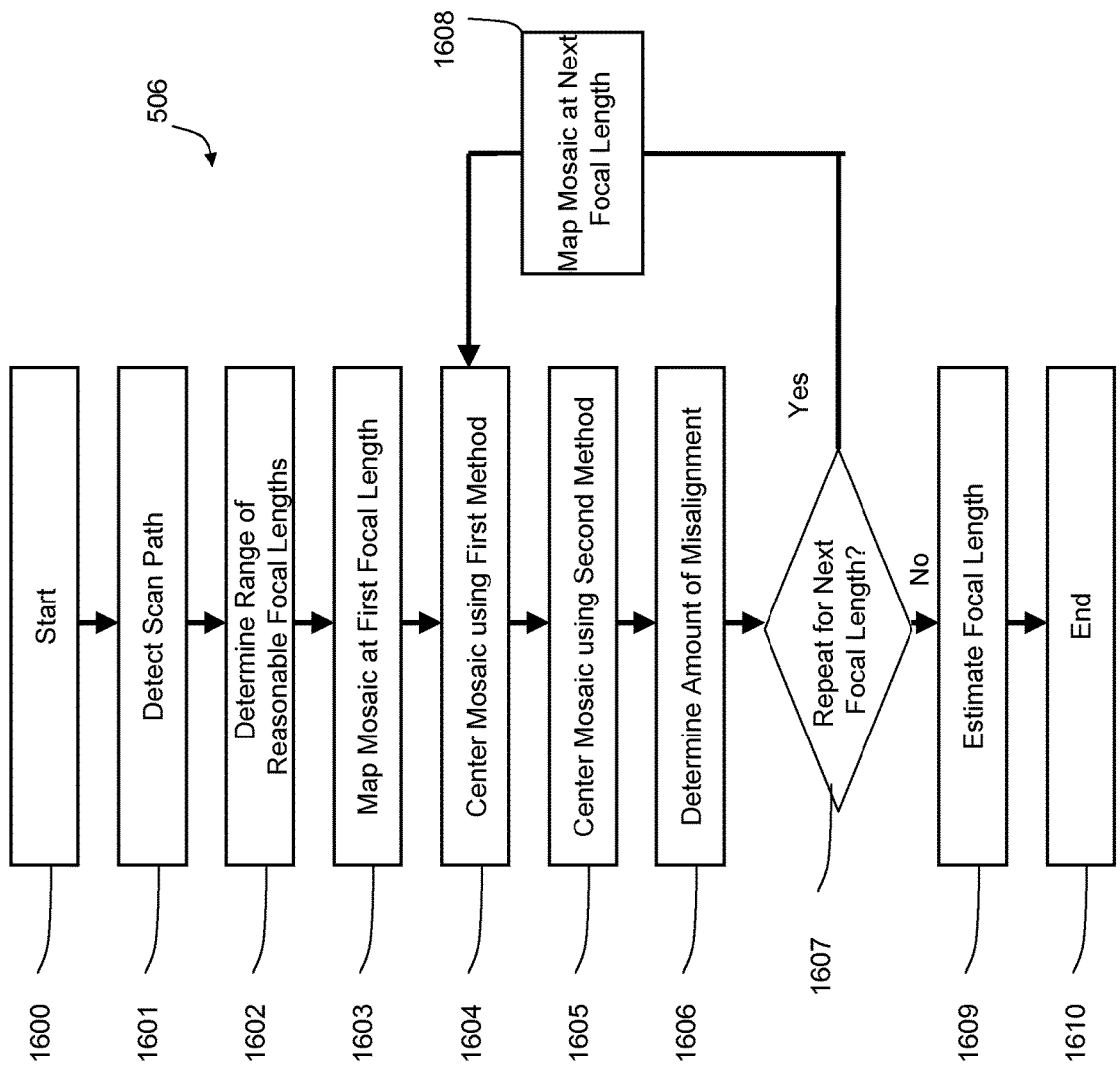
FIG. 16 depicts a flowchart for an exemplary technique by which the base focal length estimation engine 505 may determine the PTZ camera's base focal length.
Figure 17:
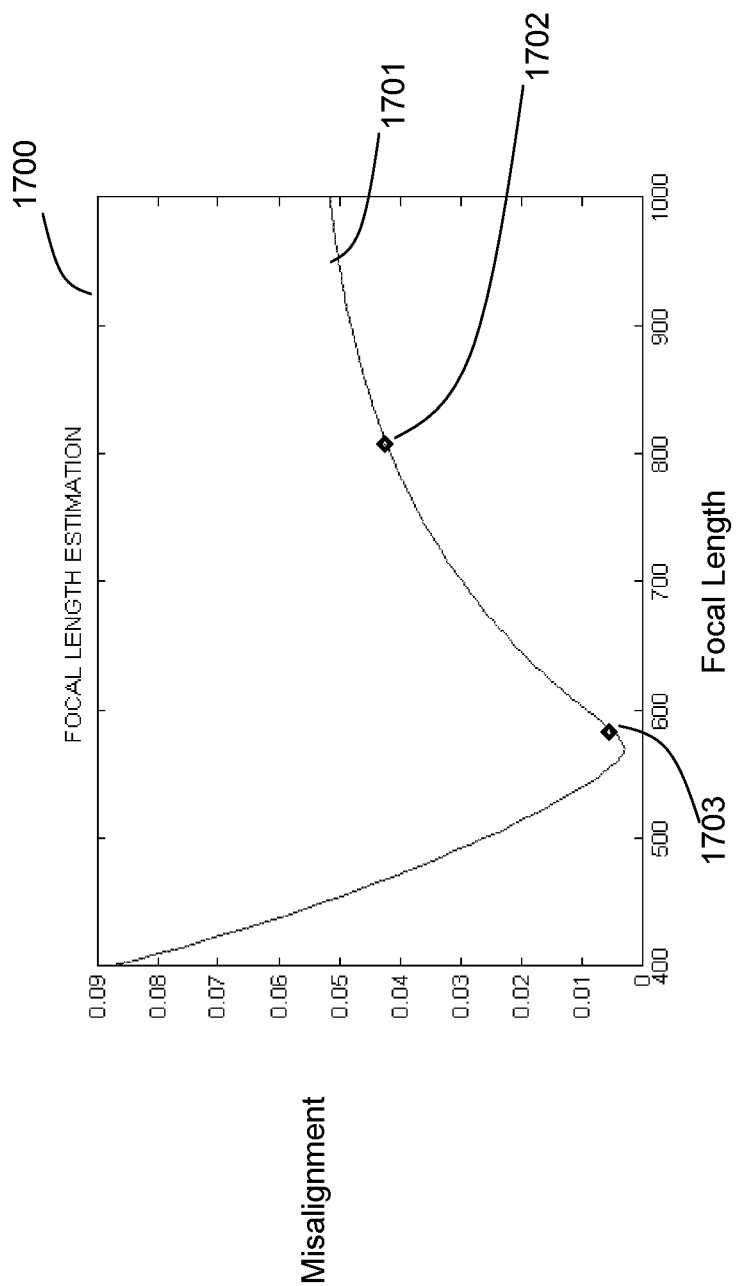
FIG. 17 depicts the results of an exemplary focal length estimation technique.

FIG. 16 depicts an exemplary technique by which the base focal length estimation engine 505 may determine the PTZ camera's base focal length. FIG. 16 is explained using FIG. 17 as an example. FIG. 17 depicts the results of an exemplary focal length estimation technique. Knowledge of the PTZ camera's approximate base focal length ensures that the frames remain undistorted on the mosaic irrespective of the camera motion. The PTZ camera's base focal length may then determine the radius of the sphere onto which the mosaic pixels are mapped.

Referring to FIG. 16, the exemplary technique may begin with block 1600 and may proceed to block 1601. In block 1601, the PTZ camera's first scan path may be detected. In block 1602, a range of reasonable base focal lengths, at which a mosaic may be mapped, may be determined. In FIG. 17, the range of reasonable base focal lengths are arranged along the X axis. In block 1603, a non-centered mosaic may be mapped onto a spherical surface at a first base focal length from the range of reasonable base focal lengths. In block 1604, the spherical mosaic may be centered using a first technique. The first technique of centering may rotate the spherical mosaic along the X, Y, and Z axes, as described above. In block 1605, the spherical mosaic may be centered using a second technique. The second technique of centering may compensate the mosaic by the inverse of the motion estimate of the center frame ($Mc^{-1}$), create a new planar mosaic with the compensated motion estimates, and then reproject the planar mosaic into spherical coordinates to arrive at a spherical mosaic. In block 1606, the amount of misalignment between the two centered, spherical mosaics, at the first base focal length, may be determined. The amount of misalignment may be determined by measuring the distance between the warped corner points of the two centered, spherical mosaics in a Cartesian coordinate system. In FIG. 17, the amount of misalignment for the first base focal length may be plotted as point 1702. In block 1607, the technique may repeat blocks 1604 through 1606 with the next base focal length from the range of reasonable base focal lengths. In block 1608, the non-centered mosaic may be mapped onto a spherical surface at the next base focal length from the range of reasonable base focal lengths. Once blocks 1604 through 1606 have been repeated for each base focal length in the range of reasonable base focal lengths, the technique may continue onto block 1609. In FIG. 17, once the amount of misalignment for each base focal length in the range of reasonable base focal lengths has been plotted, a best-fit trend line 1701 may be inserted. In block 1609 the PTZ camera's base focal length may be estimated by determining which base focal length globally minimized the amount of misalignment between the two centered, spherical mosaics. In FIG. 17, the base focal length associated with point 1703 may be identified as being the base focal length which globally minimized the amount of misalignment between the two centered, spherical mosaics. In block 1610, the exemplary technique ends.

Mosaic Feature Point Engine 506

Referring back to FIG. 5, once the PTZ camera's base focal length has been estimated by the focal length engine 505, the mosaic feature point engine 506 may reproject the mosaic and detect feature points. The reprojected spherical mosaic with feature points may then be used to estimate the PTZ camera's radial distortion, discussed below in connection with radial distortion engine 210, and/or to refine the PTZ camera's focal length estimate, discussed below in connection with base focal length engine 211.

Figure 18:
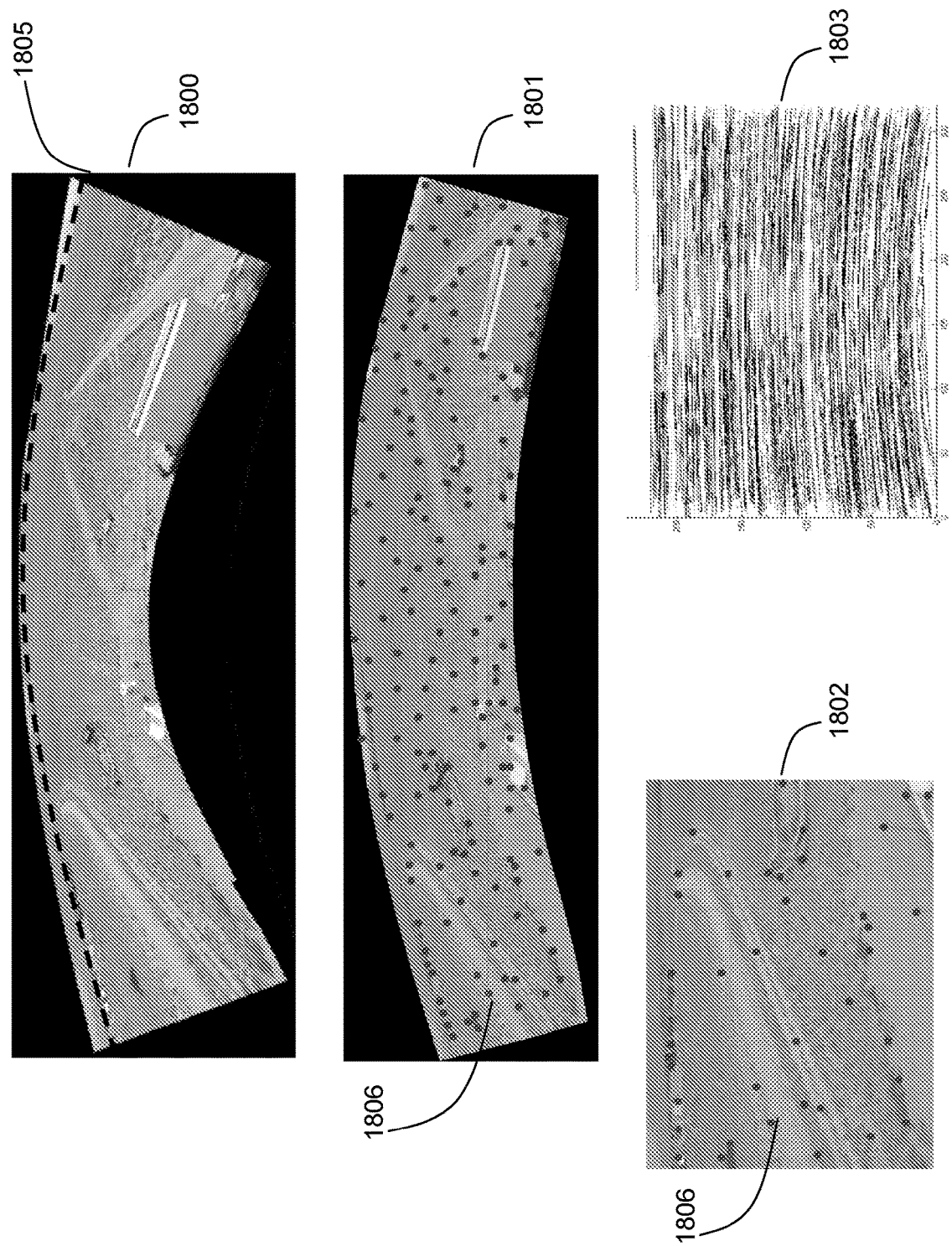
FIG. 18 depicts an exemplary planar mosaic constructed according to an exemplary frame-to-frame mosaicking technique.

FIG. 18 depicts an exemplary mosaic 1800 construct according to an exemplary frame-to-frame mosaicking technique. According to the frame-to-frame mosaicking technique, an exemplary PTZ camera's radial distortion and focal length may be estimated by sequential frame-to-frame matching. Sequential frame-to-frame matching involves comparing a feature point in an initial frame with the feature point in subsequent frames by sequential frame-to-frame matching. During frame-to-frame matching, new feature points may be added and deleted as they enter or leave the field of view. A global solution for the radial distortion and focal length estimates may be obtained by concatenating the results of these comparisons. Because it relies on local correspondences, the frame-to-frame mosaicking technique may result in a locally optimal, but globally sub-optimal solution. In addition, the frame-to-frame mosaicking approach may be fragile as a mismatch in any one frame may affect tracking accuracy in all future frames.

Referring back to FIG. 18, the dotted curve 1805 illustrates a globally suboptimal solution. The dotted curve 1805 traces a line that is actually straight in the real world (i.e. the horizon) and should project to a straight line on the planar mosaic. The warping of line 1805 may be due, in part, to radial distortion biasing frame-to-frame camera motion estimates. A globally sub-optimal solution of a PTZ camera's radial distortion may, therefore, preclude an accurate estimation of the PTZ camera's focal length. An inaccurate estimation of the PTZ camera's focal length may lead to inaccurate control of an active camera system.

In order to produce a globally optimal estimation of a PTZ camera's radial distortion and focal length, a frame-to-mosaic mosaicking technique may estimate an exemplary PTZ camera's radial distortion and focal length by using frame-to-mosaic correspondences. Frame-to-mosaic correspondences tracks feature points through all frames as they move across the field of view. Since the frame-to-mosaic mosaicking approach tracks feature points through all frames, as opposed to consecutive frames, it may generate a globally optimal solution. A globally optimal solutions may lead to more accurate estimation of the scene structure, camera motion, and focal length as well as producing a planar mosaic that better reflects the properties of a projective image plane, i.e. straight lines in the real world project to straight lines on the mosaic.

Figure 19:
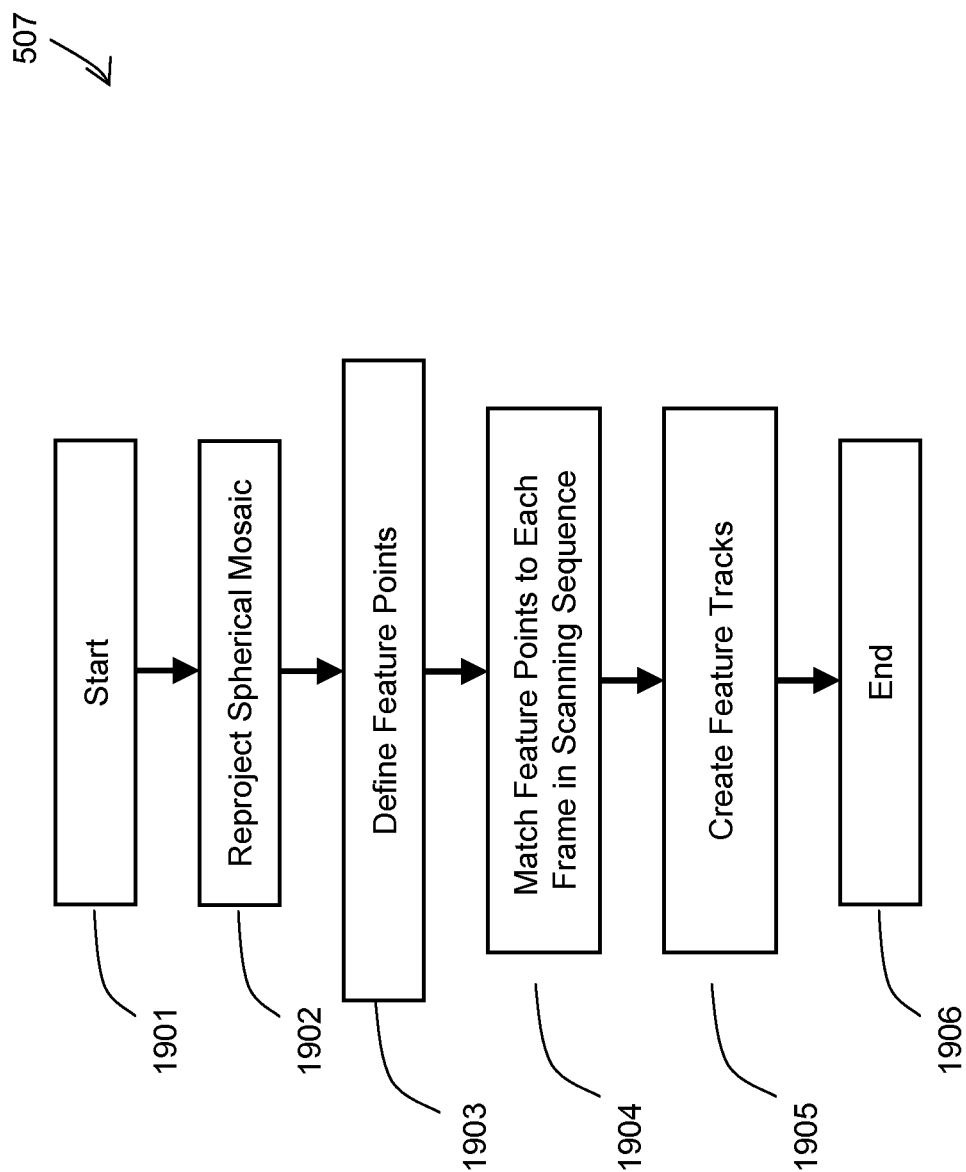
FIG. 19 depicts a flowchart for an exemplary technique by which the feature point engine may add feature points to an exemplary reprojected mosaic.

FIG. 19 depicts a flowchart for an exemplary technique by which the feature point engine 506 may detect feature points in an exemplary reprojected mosaic. The exemplary technique may begin with block 1901 and may continue onto block 1902. In block 1902, the feature point engine 506 may reproject the spherical mosaic. The spherical mosaic may have been created by engines 501-505. FIG. 18 depicts an exemplary spherical mosaic 1801. In block 1903, feature points may be detected by applying a maximum Laplacian feature detector to the spherical mosaic. FIG. 18 depicts an exemplary feature point 1806 which may have been detected in exemplary spherical mosaic 11801 by a maximum Laplacian feature detector. In block 1904, the feature points, which have been identified in the spherical mosaic, may be matched to each individual frame used to create the spherical mosaic. FIG. 18 depicts an exemplary individual frame 1802 which was used to create spherical mosaic 1801. In individual frame 1802, feature point 1806, which was identified in spherical mosaic 1801, may have been matched to individual frame 1802. In block 1905, the identified feature points from each individual frame may be combined to create feature tracks for the identified feature points. FIG. 18 depicts exemplary feature tracks 1803 for the feature points identified in spherical mosaic 1801. In block 1906, the technique may end.

Since this mosaic-to-frame matching performed in block 1904 of FIG. 19 may be performed for each individual frame, a mismatch, or even a missing feature, in any frame may remain a local error and may not impede tracking in other frames. This may enable exemplary technique depicted in FIG. 19 to produce a larger number of good feature tracks. Furthermore, the search for frame features may be limited to a small region around feature points since a good estimate of the frame-to-mosaic registration may be known from construction of the initial mosaic.

The exemplary technique depicted in FIG. 19 may assume that the camera path is a pure pan with a fixed focal length, tilt and roll. The exemplary technique may also assume a camera with zero skew, square pixels and principal point at the center of the image plane. But it should be clear to anyone of ordinary skill in the art how to extend the technique when these assumptions are relaxed.

Identifying PTZ Camera Parameter(s)

Referring back to FIGS. 1 and 2, an exemplary PTZ calibration module 104 may identify a PTZ camera's parameter(s). The parameter(s) may then be output to the PTZ camera controller 103. The PTZ controller 103 may then use all or part of the information obtained by the PTZ calibration module 104 to translate information input from the video-analysis module 102 into executable commands for the PTZ camera 101.

According to some embodiments of the invention, the PTZ calibration module 104 may contain one or more of a radial distortion engine 210 which may determine a PTZ camera's radial distortion, a base focal length engine 211 which may determine a PTZ camera's base focal length, a zoom/magnification profile engine 212 which may determine a PTZ camera's zoom/magnification profile, an actuation delay engine 213 which may determine a PTZ camera's actuation delay, a pan/tilt position mode speed engine 214 which may determine a PTZ camera's pan position and/or tilt position mode speed, a pan/tilt velocity profile engine 215 which may determine a PTZ camera's pan velocity and/or tilt velocity profile, a zoom position and duration profile engine 216 which may determine a PTZ camera's zoom position and/or duration profile, and a query delay engine 217 which may determine a PTZ camera's query delay, a minimum query interval engine 218 which may determine a PTZ camera's minimum query interval, and/or a mosaic generation engine 219. These engines may be arranged in any order within the PTZ calibration module 104.

Radial Distortion Engine 210

Radial distortion may refer to a non-linear deviation from the ideal projective camera model. Radial distortion may be present in cameras with lenses and may be a major source of error in computing frame-to-frame homography. Corresponding features in a pair of frames from a rotating camera may be related by a planar homography if and only if the radial distortion may be zero. Radial distortion, if not corrected, may result in the creation of an inaccurate mosaic.

Figure 20:
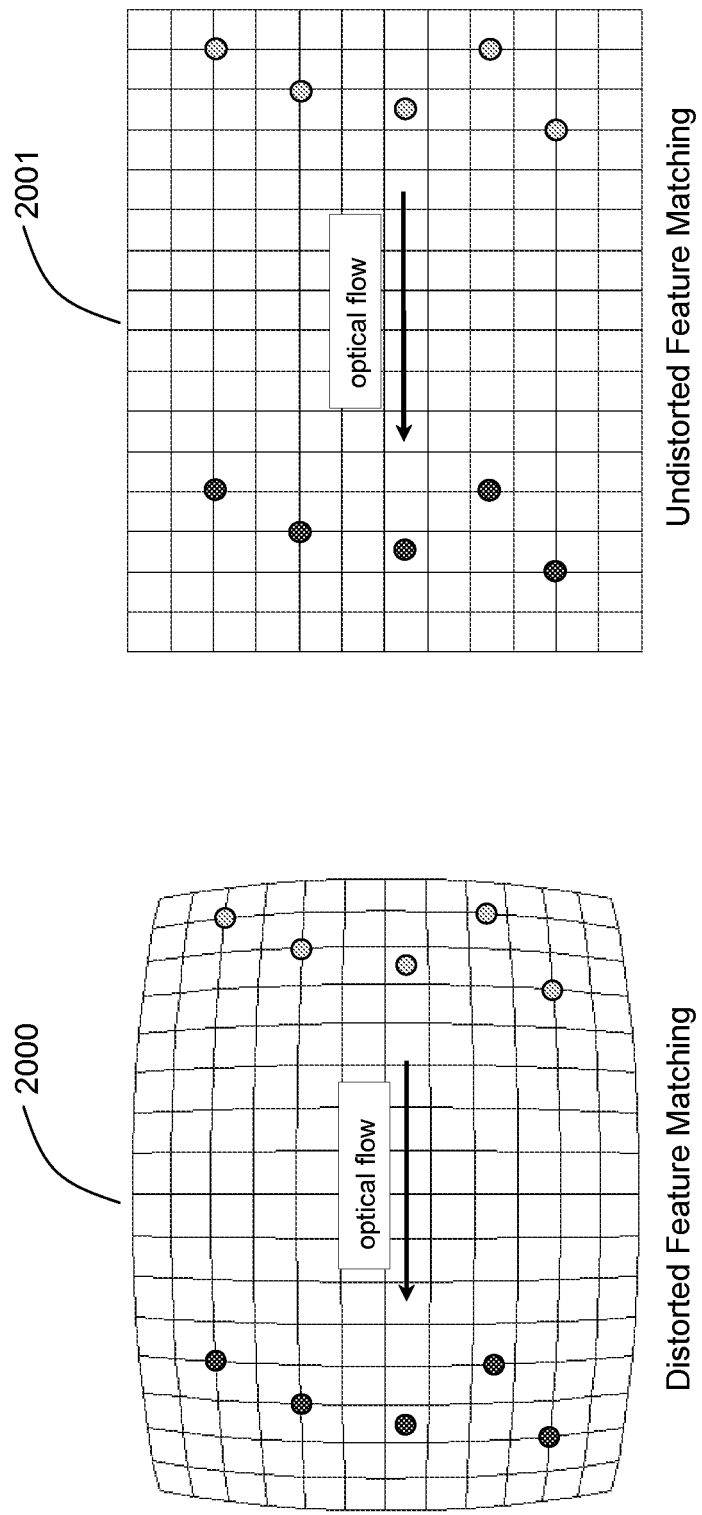

FIG. 20 depicts an exemplary image 2000 in which radial distortion has not been compensated for and an exemplary image 2001 in which radial distortion has been compensated for. Image 2000 depicts an exemplary image plane in which straight lines have been projected as curved lines due to radial distortion. The radial distortion in image 2000 lacks a planar homography which may prevent an accurate mapping of a first set of points to a second set of points and thereby prevents feature matching. An inaccurate mosaic, in turn, leads to the inaccurate control of an active camera system.

Radial distortion may be expressed in equations (3) and (4). If $x_u$ is the ideal projection of a point on the image plane and $x_d$ is the radially distorted measurement, then an approximate model for radial distortion may be:

$$x_d(x_u,k)=C+(x_u-c)(k|x_u-c|^2+1) \quad (3),$$

where c is the distortion center (usually approximated as the image center) and k is the first order distortion coefficient. Since the inverse of the above function is not single-valued, it may be approximated as:

$$x_u(x_d,k)=c+(x_d-c)(k/|x_d-c|^2+1) \quad (4)$$

Radial distortion may be compensated for once the distortion coefficient k is determined. Referring back to FIG. 20, image 2001 depicts an exemplary image plane in which radial distortion has been compensated for and straight lines have been projected as straight lines. Because the radial distortion in image 2001 has been compensated for, image 2001 contains planar homography which may allow for the accurate mapping of a first set of points to a second set of points and thereby allow for feature matching with zero reprojection error.

Radial distortion may cause an increase in the projection error when fitting an over-constrained planar homography to an undistorted set of feature points. Thus, an optimal distortion coefficient may minimize the reprojection error when fitting a planar homography to an undistorted set of feature points via Equation (4).

Figure 21:
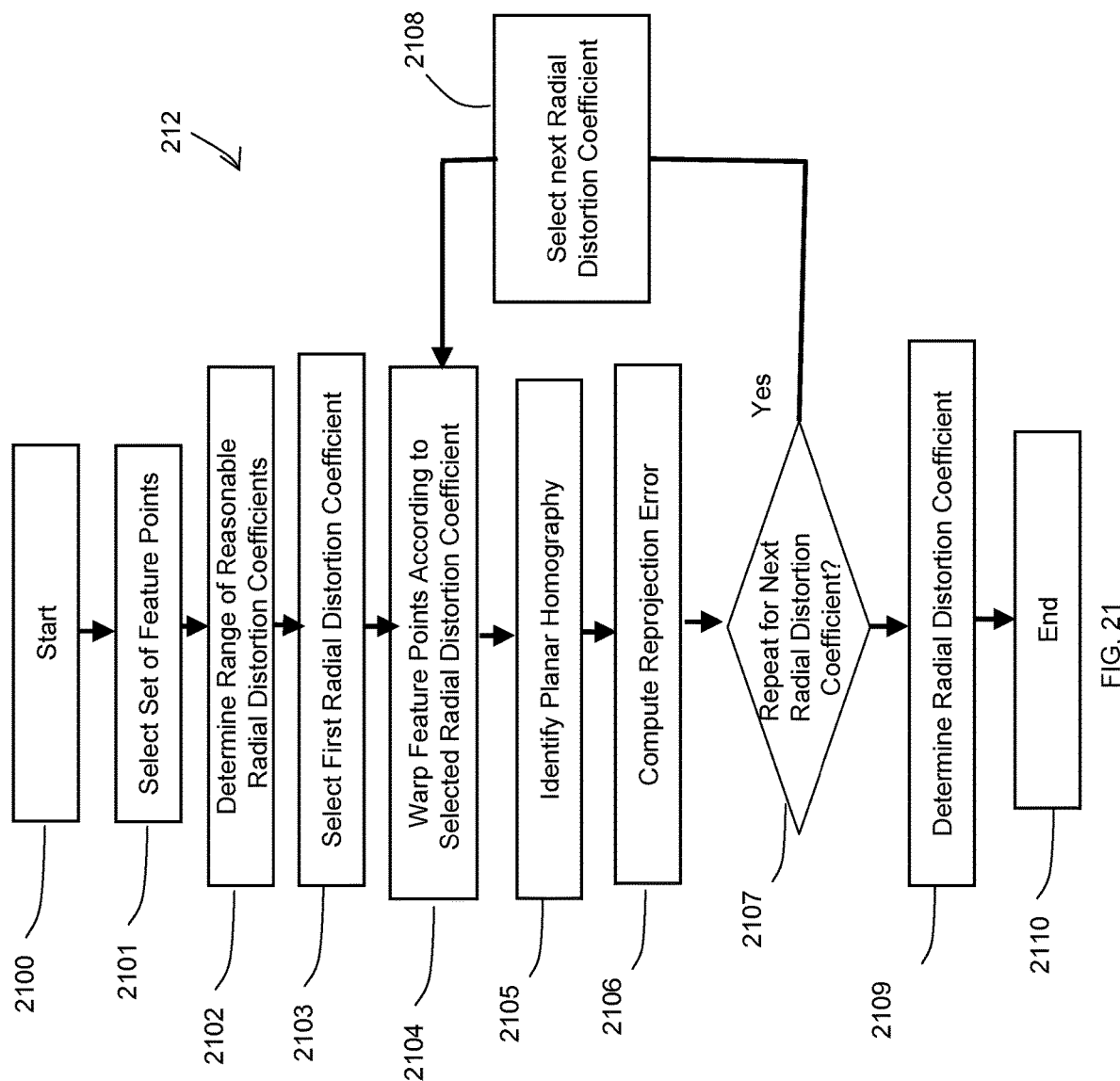
FIG. 21 depicts a flowchart for an exemplary technique by which the radial distortion engine may estimate a PTZ camera's radial distortion.

FIG. 21 depicts a flowchart for an exemplary technique by which the radial distortion engine 210 may estimate a PTZ camera's radial distortion. The exemplary technique may begin with block 2100 and may continue onto block 2101. In block 2101, a set of feature points s, identified by the mosaic feature point engine 506, may be selected. Since radial distortion may be more pronounced far from the image center, a set of distorted feature points s may be selected by selecting a set of frames, from a sequence of frames, which contain a set of distorted feature points s that exceed some minimum separation on the image plane. In block 2102, a range of reasonable radial distortion coefficients may be determined. In block 2103, a first radial distortion coefficient may be selected. In block 2104, the feature points may be warped according to the selected radial distortion coefficient. In block 2105, a planar homography Hs may be estimated for the selected radial distortion coefficient. The planar homography may be estimated using the conventional least-squares technique on feature points s. In block 2106, the reprojection error may be computed. In block 2107, the exemplary technique may repeat blocks 2104 through 2106 with the next radial distortion coefficient from the range of reasonable radial distortion coefficients. In block 2108, the next radial distortion coefficient from the range of reasonable distortion coefficients may be selected. Once blocks 2104 through 2106 have been repeated for radial distortion coefficient from the range of reasonable distortion coefficients, the technique may continue onto block 2109. In block 2109, the radial distortion coefficient k may be identified. If $x_{s,i}$ and $x'_{s,i}$ represent the $i^{th}$ corresponding (distorted) feature point pair in set s, then the radial distortion coefficient k may be estimated over all sets as:

$$\hat{k} = \operatorname{argmin}_k \sum_s \sum_i |x_u(x_{s,i}, k) - H_s x_u(x'_{s,i}, k)|^2. \tag{5}$$

The estimation of the radial coefficient k may be implemented numerically using a bracketing search over the small range of k known to occur in typical PTZ cameras. In block 2103, the exemplary technique may end.

Base Focal Length Engine 211

A PTZ camera's base focal length may refer to the focal length of the PTZ camera when it is totally zoomed out. Knowledge of the PTZ camera's base focal length combined with knowledge of the PTZ camera's zoom profile, discussed below in connection with the a zoom and magnification profile engine 212, may enable the estimation of the PTZ camera's focal length at each of the PTZ camera's zoom levels. Once the PTZ camera's focal length at each zoom level is estimated, pixel offsets in image coordinates may be accurately converted into pan and tilt angles for active camera control.

Figure 22:
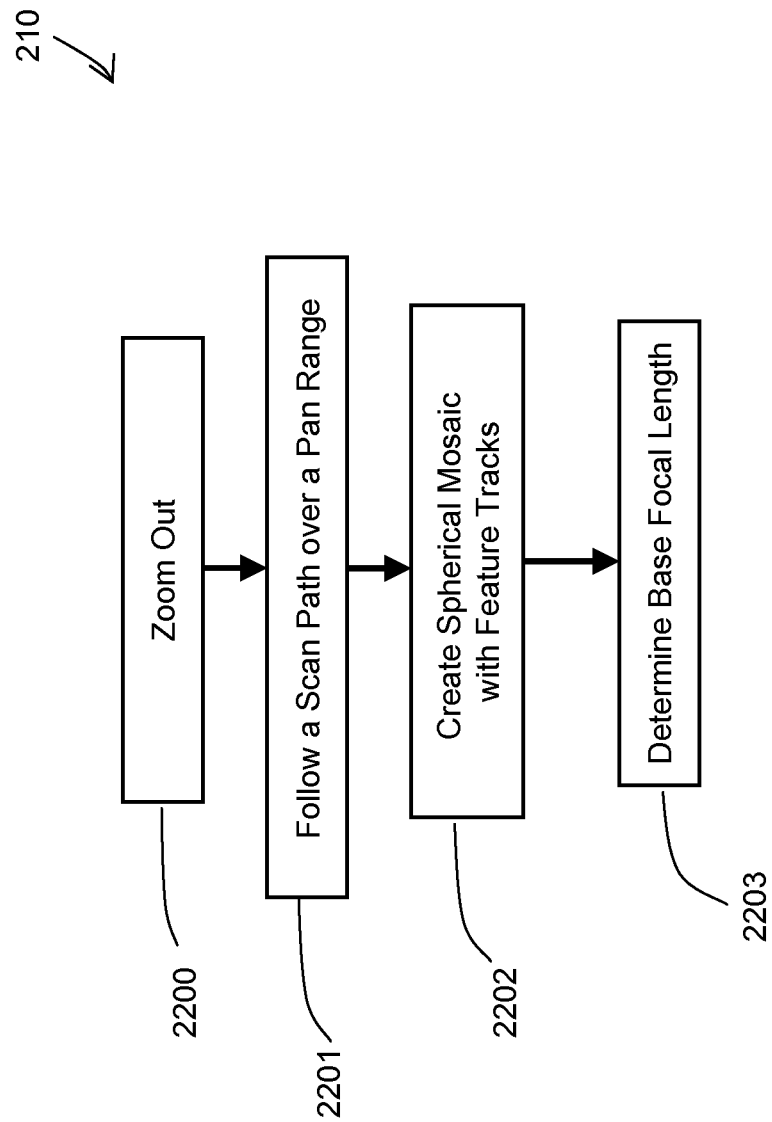
FIG. 22 depicts a flowchart for an exemplary technique by which the base focal length engine may determine the base focal length of a PTZ camera.

FIG. 22 depicts a flowchart for an exemplary technique by which the base focal length engine may determine the base focal length of a PTZ camera 211. In block 2200 of FIG. 22, the base focal length of the camera may be set to its minimum zoom level. In block 2201, the PTZ camera 101 may be commanded to follow a scan path over a pan range while keeping the PTZ camera's 101 tilt and roll quantities constant. In an exemplary embodiment, the scan path may be short, and the pan range may be small (e.g. +/−0.5 radians). In block 2202, a spherical mosaic with feature tracks may be generated. The process for generating a spherical mosaic with feature tracks is discussed above in connection with the mosaic generation engine 219. In block 2203, the base focal length may be determined. Block 2203 may be discussed in further detail below.

Figure 23:
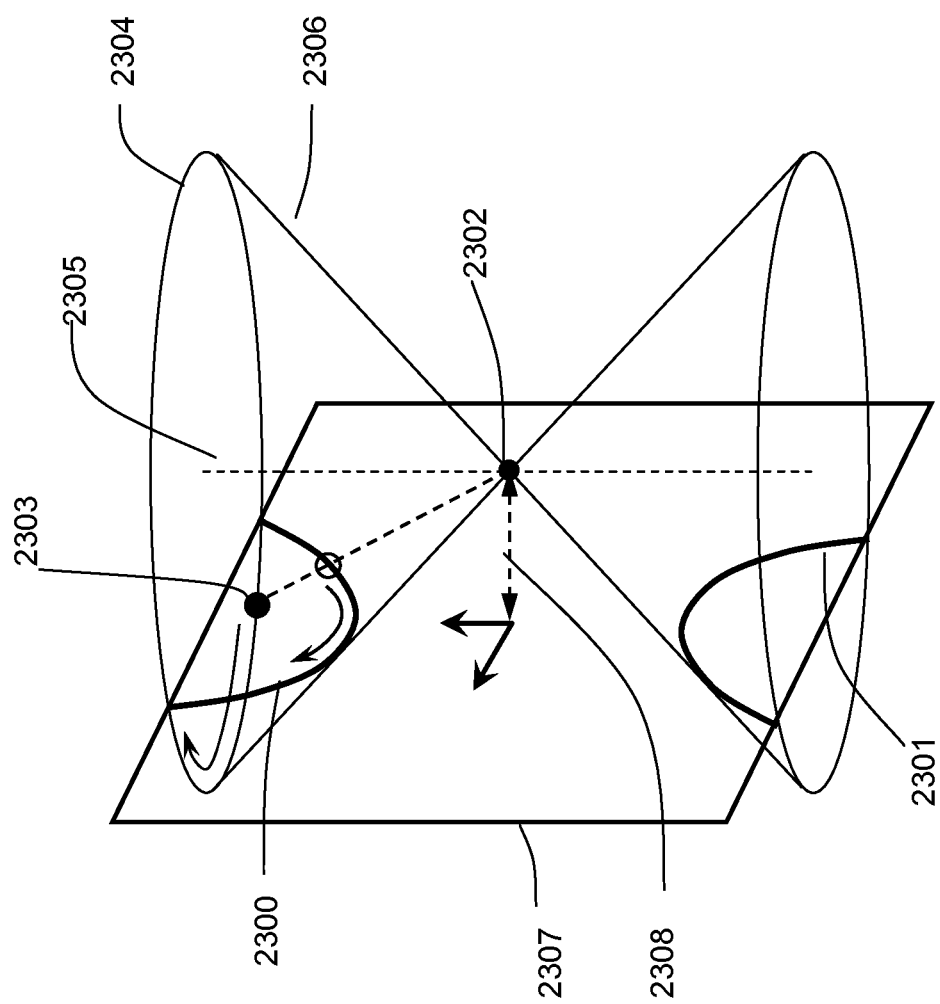
FIG. 23 depicts the feature tracks from an exemplary rotating camera.

FIG. 23 depicts the feature tracks from an exemplary rotating camera. According to some embodiments of the invention, the PTZ camera's base focal length may be determined in block 2203 by analyzing the feature tracks 1803, discussed in connection with FIG. 18. This determination may be based on the observation that the feature tracks from an exemplary rotating camera may be described by conics 2300 and 2301 in FIG. 23. As the camera rotates about the camera center 2302, a feature point 2303 may inscribe a circle 2304. The feature point 2303 may also inscribe a circular arc (not shown) where the camera's pan path comprises less than a complete circle. The circle 2304 or circular arc may be centered on and in a plane perpendicular to the pan axis 2305. The line joining the feature point 2303 to the camera center sweeps out a cone 2306. The line joining the feature point 2303 to the camera center may also sweep out a partial cone (not shown) where the camera's pan path is less than a complete circle. The intersection of this cone 2306 with the image plane 2307 may be the conic trajectory that the projection of the feature point 2303 follows on the image plane.

In the case of zero tilt and roll, the conic may be a hyperbola that may be modeled as:

$$y = (y_0/f^2)\sqrt{x^2 + f^2} \tag{6}$$

where f is the camera focal length 2308 and $y_0$ is the intersection of the hyperbola with the Y axis of the image plane. The above model may be a function of only the focal length f, tilt $\theta$, and roll $\psi$. An exemplary estimation procedure for estimating which the focal length f, tilt $\theta$, and roll $\psi$ parameters lead to the best fit of the above model to the observed feature trajectories may be described below.

Let $x_{i,j} = (x_{i,j}, y_{i,j})T$ represent a set of image plane measurements on the conic for the $j^{th}$ feature (i.e., the $j^{th}$ feature track 1803 of FIG. 18) after compensation for radial distortion. Then, given an estimate of the tilt $\theta$, roll $\psi$ and focal length f, these points may be transformed to a camera frame with zero tilt and roll as follows:

$$x'_{i,j} = KR_x(\theta)R_z(\psi)K^{-1}x_{i,j} \tag{7}$$

where $R_x$ and $R_z$ are rotations about the X and Z camera axes and K is the camera calibration matrix for the case of square pixels, zero skew and principle point at the image center. Now, for a given track, a least-squares estimate of $y_{0,j}$ may be found by minimizing the residual error $e^2_j$ given by:

$$e^2_j = \sum_i \left[ y'_{i,j} - (y_{0,j}/f^2)\sqrt{x'^2_{i,j} - f^2} \right]^2. \tag{8}$$

This optimization may be solved analytical as follows:

$$y_{0,j} = \left[ \sum_i y'_{i,j} \sqrt{x'^2_{i,j} + f^2} \right] / \left[ \sum_i (x'^2_{i,j} + f^2) \right]. \tag{9}$$

The minimum residue $\hat{e}^2$ corresponding to the above solution may be found by substituting $y_{0,j}$ from equation (9) into equation (8). The above analysis may provide a framework for estimating f, $\theta$ and $\psi$ as the optimal solution that may minimize the total residue over all trajectories:

$$(f, \theta, \psi) = \operatorname{argmin}_{f,\theta,\psi} \sum_j \hat{e}^2_j(x_{i,j}, f, \theta, \psi). \tag{10}$$

The above optimization may be implemented as a Levenberg-Marquardt numerical search.

Zoom and Magnification Profile Engine 212

A PTZ camera's zoom and magnification profile may refer to a record of the PTZ camera's actual magnification at a given zoom level. Knowledge of the PTZ camera's base focal length, discussed above in connection with the base focal length engine 211, combined with knowledge of the PTZ camera's zoom profile may enable the estimation of the camera's focal length at each of the PTZ camera's zoom levels. Once the PTZ camera's focal length at each zoom level is estimated, pixel offsets in image coordinates may be accurately converted into pan and tilt angles for active camera control.

Figure 24:
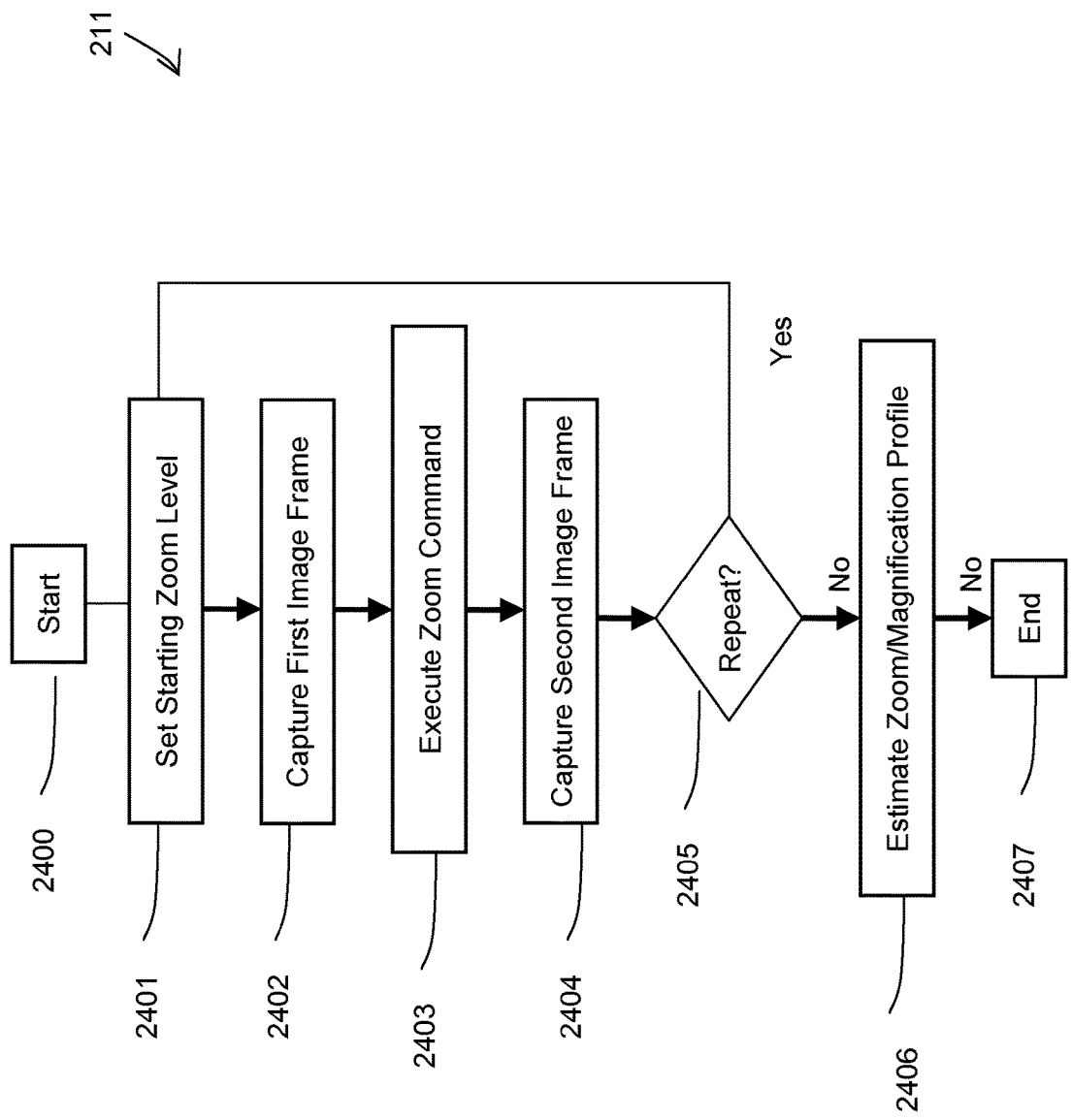
FIG. 24 depicts a flowchart for an exemplary technique by which the zoom and magnification profile engine 212 may estimate a PTZ camera's zoom/magnification profile.
Figure 25:
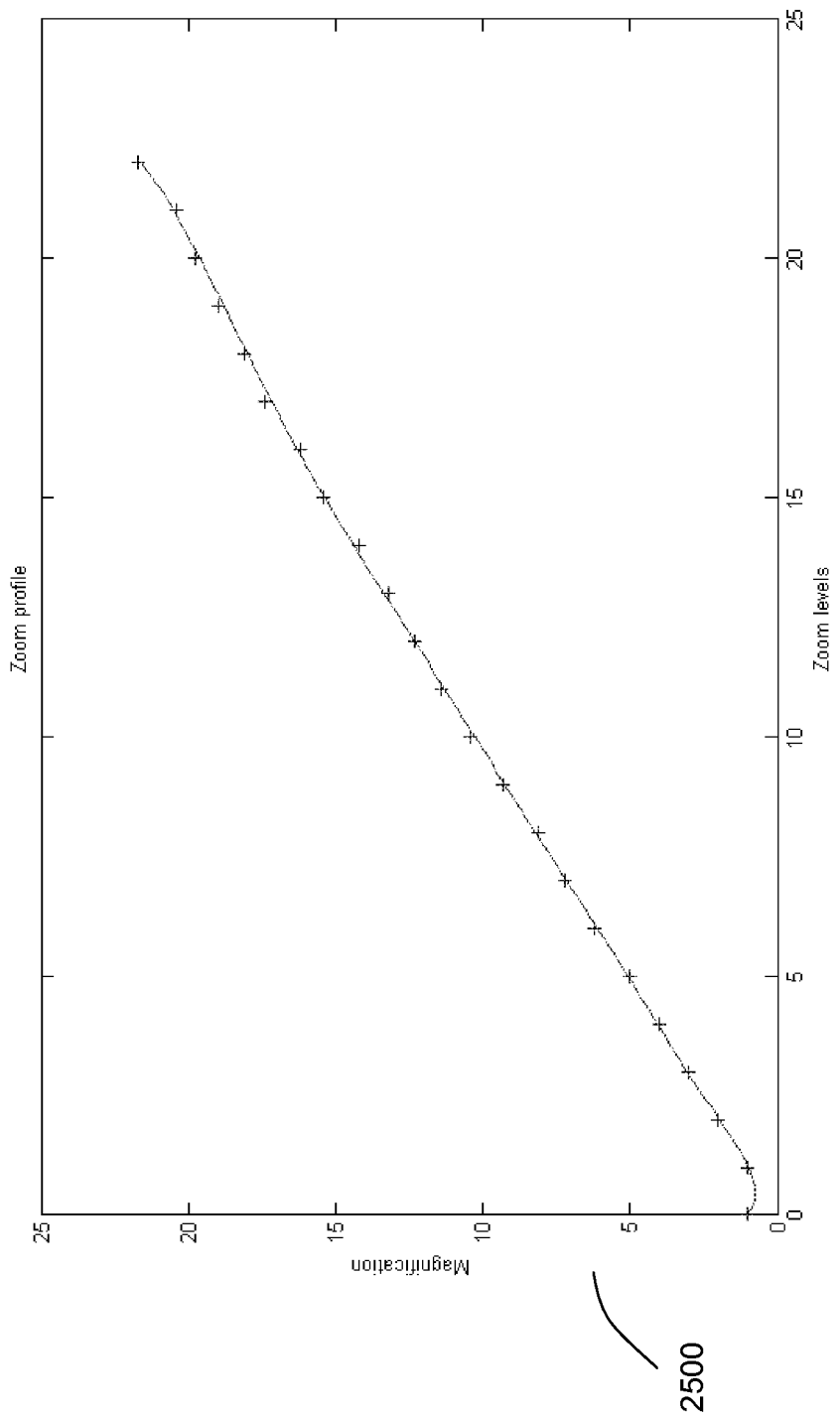
FIG. 25 depicts an exemplary measured zoom profile for an exemplary PTZ camera.

FIG. 24 depicts a flowchart for an exemplary technique by which the zoom and magnification profile engine 212 may estimate a PTZ camera's zoom/magnification profile. A PTZ camera may implement an arbitrary non-linear scale between zoom levels and actual magnification. Knowledge of the zoom/magnification profile may better enable the PTZ controller 103 to maintain a visual target at an optimal size on the image plane. The exemplary technique depicted in FIG. 24 starts with block 2400 and may continue onto block 2401. In block 2401, PTZ camera's starting zoom level may be set. In block 2402, a first image frame may be captured. In block 2403, a zoom command may be executed. In block 2404, a second image frame may be captured. In block 2405, the flow may repeat blocks 2401-2404 over the full range of the PTZ camera or continue to block 2406. In block 2406, the zoom/magnification profile may be estimated. To estimate the zoom profile, and the first image frame 2402, before the execution of the zoom command 2403, and the second image frame 2404, after the execution of the zoom command, may be compared. The magnification between each pair of frames may then be calculated using a brute force search over scales. At each scale, the final (zoomed in) frame may be scaled (reduced in size) and the corresponding overlapping area from the initial (zoomed out) image may be extracted. The two images may then be compared, and an estimated magnification determined, using an image matching technique. An exemplary image matching technique may include identifying a similarity measurement based on the correlation of edge histograms, summed over rows and columns, for both images. The estimated magnification may be the scale that maximizes this similarity measure. Multiplying the scales over all frame pairs may yield the complete zoom profile. FIG. 25 depicts an exemplary measured zoom profile 2500 for an exemplary PTZ camera. Measure zoom profile 2500 may be approximately linear. In other exemplary embodiments of the PTZ camera, the measured zoom profile may be nonlinear.

Actuation Delay Engine 213

Actuation delay may refer to the time between issuing a velocity command and observing the resulting camera motion. An actuation delay may exist, independently, for a pan movement, a tilt movement, and a zoom movement and may be estimated individually using the technique described below. Actuation delay may result, for example, from signal processing delays and/or mechanical characteristics such as acceleration. Knowledge of one or more of the actuation delays may better enable the PTZ controller 103 to compensate for one or more of the actuation delays and maintain accurate and stable control of the active camera system.

Figure 26:
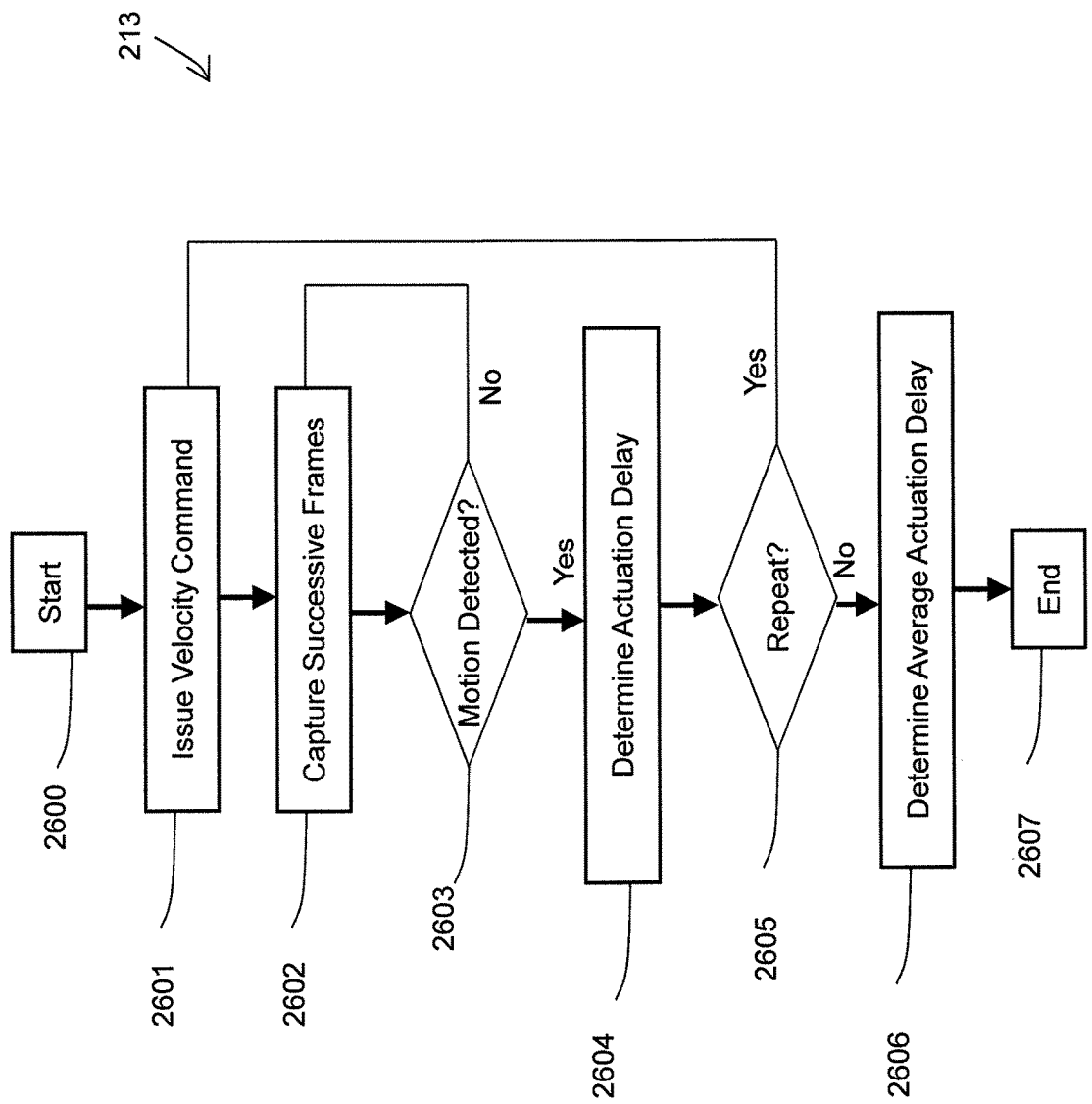
FIG. 26 depicts a flowchart for an exemplary technique by which the actuation delay engine may estimate the actuation delay of a PTZ camera.

FIG. 26 depicts a flowchart for an exemplary technique by which the actuation delay engine 213 may estimate the actuation delay of a PTZ camera. The exemplary technique depicted in FIG. 26 for detecting an actuation delay starts with Block 2600 and may continue to block 2601. In block 2601, the PTZ camera 101 may be issued a velocity command. In block 2602 successive image frames may be captured. In block 2603 the most recently captured frame may be compared to a frame that preceded it in order to detect motion. Embodiments of the invention may compare the two frames in order to detect motion by, for example, using frame differencing and thresholding. If motion is detected, the technique may move onto block 2604. If motion is not detected, the technique may move onto block 2602. In block 2604, the actuation delay may be measured as the difference in system time between sending a motion command and observing the first moving frame. In block 2605, the process may repeat blocks 2601-2604 or proceed to block 2606. In block 2606, the average actuation delay may be determined based on the amount of times blocks 2601-2604 were repeated. In block 26074, the technique of estimating a PTZ camera's 101 actuation delay may end.

Pan and Tilt Position Mode Speed Engine 214

Position mode speed may refer to a PTZ camera's speed in response to a pan/tilt position command. A pan/tilt position command may direct the camera to move the specified pan/tilt amount (which may be expressed in radians) relative to the camera's current position. Knowledge of the PTZ camera's 101 pan and tilt position mode speeds may allow the PTZ controller 103 to estimate the time interval between issuing a pan and/or tilt command and when the camera will finish executing it. The pan and tilt speeds are typically independent of the camera position.

Figure 27:
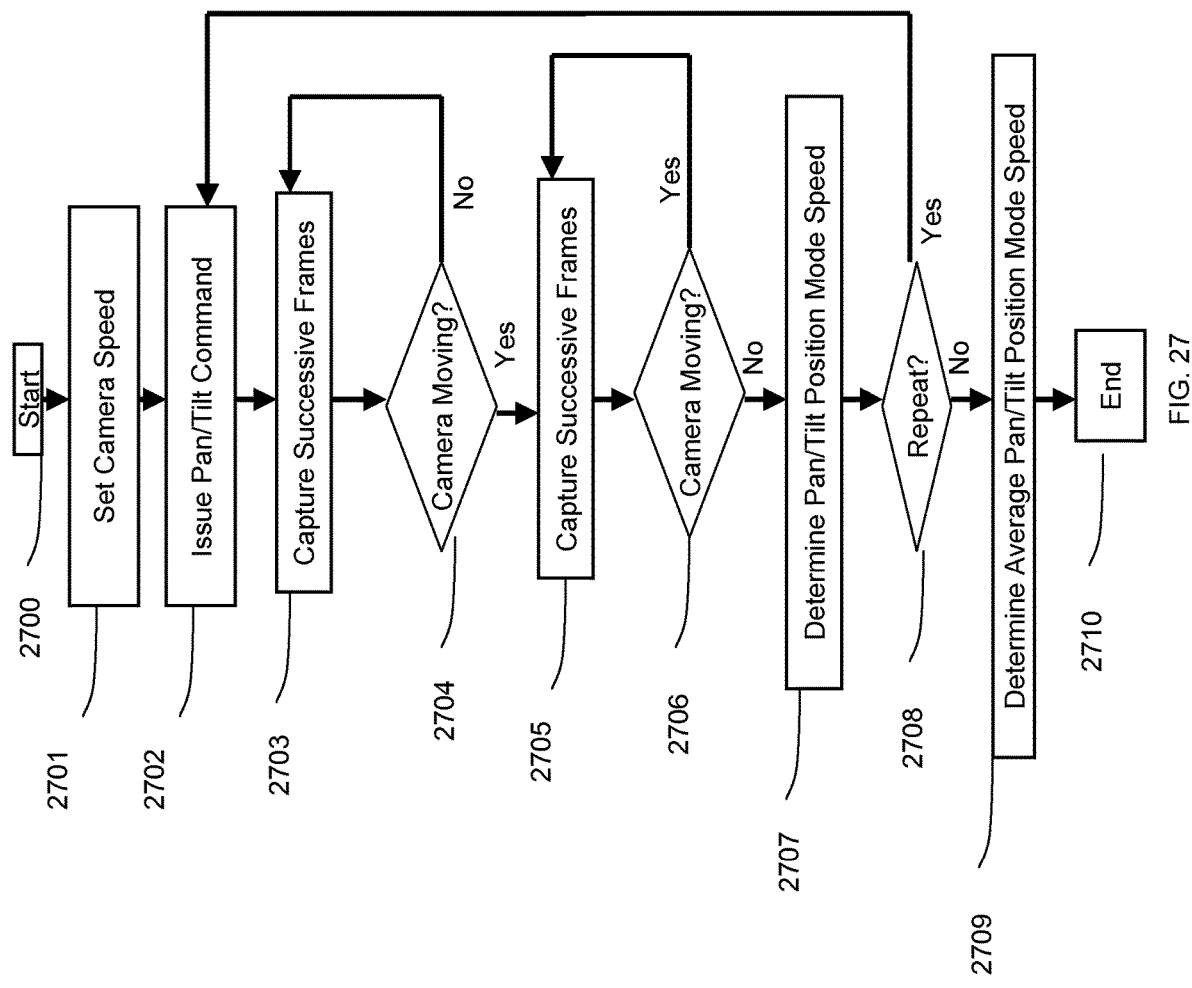
FIG. 27 depicts a flowchart for an exemplary technique by which the pan and tilt position mode speed engine may estimate a PTZ camera's pan and/or tilt position mode speed.

FIG. 27 depicts a flowchart for an exemplary technique by which the pan and tilt position mode speed engine 214 may estimate a PTZ camera's pan and/or tilt position mode speed. The exemplary technique begins with block 2700 and may continue to block 2701. In block 2701, the camera speed may be set. In block 2702, the PTZ camera 101 may be issued a pan and/or a tilt command. In block 2703, successive image frames may be captured. In block 2704, the captured successive frames may be compared in order to detect motion. Embodiments of the invention may compare the two frames in order to detect motion by, for example, using frame differencing and thresholding. If motion is detected, the technique may move onto block 2705. If motion is not detected, the technique may move onto block 2703. In block 2705, successive image frames may be captured. In block 2706, the captured successive frames may be compared in order to detect motion in the manner discussed above in connection with block 2704. If motion is detected, the technique may move onto block 2705. If motion is not detected, the technique may move onto block 2707. In block 2707, the plan or the tilt mode speed 214 may be determined. Embodiments of the invention may determine the pan and tilt mode speed by dividing the angular separation of the images by the time difference between issuing the pan/tilt position command (after compensating for the actuation delay) and when the camera motion stops. The angular separation of the images may be determined from the pan/tilt command itself. In block 2708, the process may repeat blocks 2702-2707 or proceed to block 2709. In block 2709, the average pan and/or tilt position mode speed may be determined based on the amount of times blocks 2702-2707 were repeated. In block 2710, the exemplary technique ends. The exemplary technique for detecting a pan and/or a tilt position mode speed may be repeated in the event the camera may operate at more than one camera speed.

Pan/Tilt Velocity Profile Engine 215

A PTZ camera's pan velocity profile and tilt velocity profile may refer to the relationship between the commanded pan or tilt velocity and the actual pan or tilt camera velocity. The pan velocity profile and tilt velocity profile may also contain the maximum actual camera velocity for each axis. Knowledge of how the input velocity commands map to the physical velocity of the camera motors may better enable the PTZ controller 103 to maintain accurate and stable control of the active camera system. Pan and tilt velocity may be expressed in terms of arbitrary units (such as encoder counts per second) or quantities such as radians/sec. In any case, the reliability of the reported values may suffer from quantization error or other inaccuracies. For optimal performance and to maintain compatibility with the broad range of currently available PTZ cameras, pan and tilt speeds may be calibrated automatically.

Figure 28:
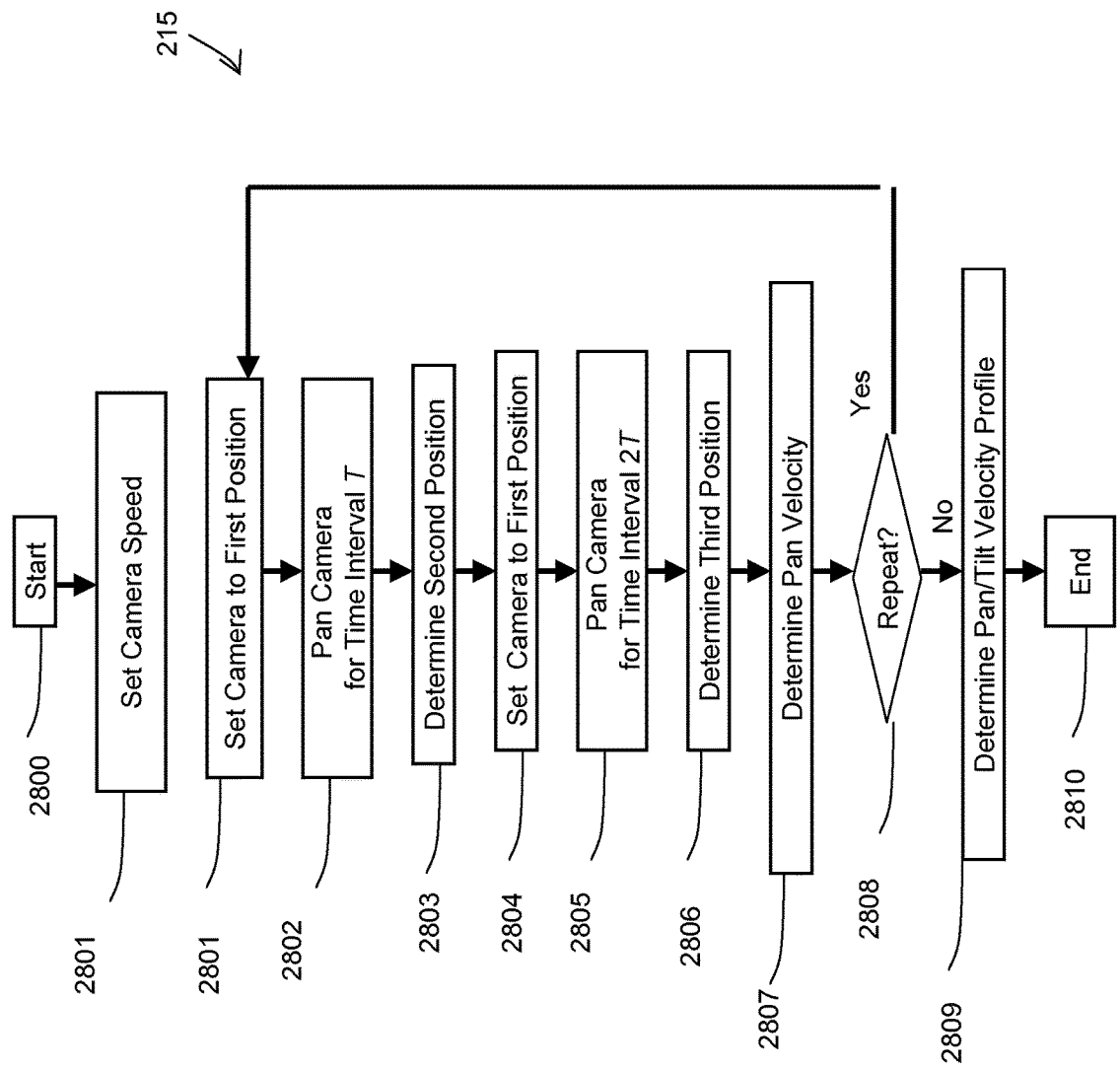
FIG. 28 depicts a flowchart for an exemplary technique by which the pan/tilt velocity profile engine may estimate a PTZ camera's pan velocity profile and/or tilt velocity profile.

FIG. 28 depicts a flowchart for an exemplary technique by which the pan/tilt velocity profile engine 215 may estimate a PTZ camera's pan velocity profile and/or tilt velocity profile. FIG. 28 depicts an exemplary embodiment of the pan/tilt velocity profile engine 215. The pan/tilt velocity profile engine 215 may calculate the pan velocity profile and the tilt velocity profile in a similar manner. The exemplary technique depicted in FIG. 28 starts with block 2800 and may continue immediately to block 2801. In block 2800, the camera speed may be set. In block 2802, the camera may be placed in a known first camera position. In block 2803, the camera may pan at a given but unknown pan velocity for a fixed time interval T. In block 2804, a second camera position may be determined. The second camera position may be determined by querying the camera to compute the total camera movement. In block 2805, the camera may be placed in the first camera position. In block 2806, the camera may pan at the same pan velocity for a fixed time interval 2T. In block 2807, a third camera position may be determined. The third camera position may be determined by querying the camera to compute the total camera movement. In block 2808, the pan velocity may be determined by dividing the angular difference between the second camera position and the third camera position by time interval T. The exemplary technique for determining the pan velocity in block 2808 may ensure that errors due to actuation delays and camera motor acceleration are cancelled out. In block 2809, the process may repeat blocks 2803 through 2808 or proceed to block 2810. In block 2810, the pan velocity profile 2900 may be determined. The pan velocity profile 2900 may be represented by fitting a high order polynomial to measured velocities, found using the technique described above, uniformly spaced over the input velocity range. In block 2811, the exemplary technique may end. The tilt velocity profile may be determined in a similar manner.

Figure 29:
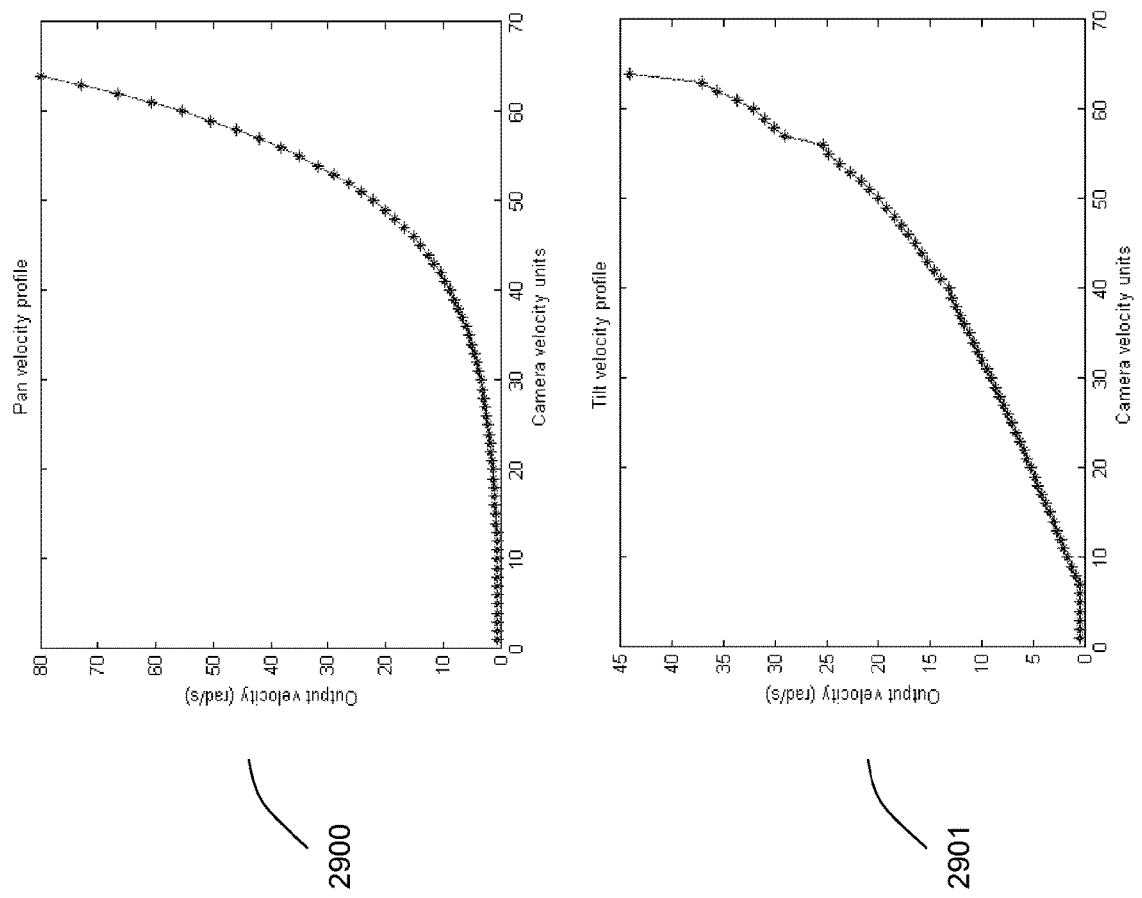
FIG. 29 depicts an exemplary nonlinear pan velocity profile 2900 and nonlinear tilt velocity profiles 2901 for an exemplary PTZ camera.

FIG. 29 depicts an exemplary nonlinear pan velocity profile 2900 and nonlinear tilt velocity profiles 2901 for an exemplary PTZ camera. The maximum pan/tilt velocity may be the highest input setting that results in a velocity measurement.

Zoom Position and Duration Profile Engine 216

The zoom position profile may represent the zoom setting attained after zooming in from the minimum zoom for a given duration at a given zoom speed setting. The duration profile may represent the inverse of the zoom position profile, e.g., how long it takes the camera to zoom into a given value from a minimum zoom. Knowledge of the PTZ camera's 101 zoom position profile and duration profile may allow the PTZ controller 103 to maintain a visual target at an optimal zoom level.

Figure 30:
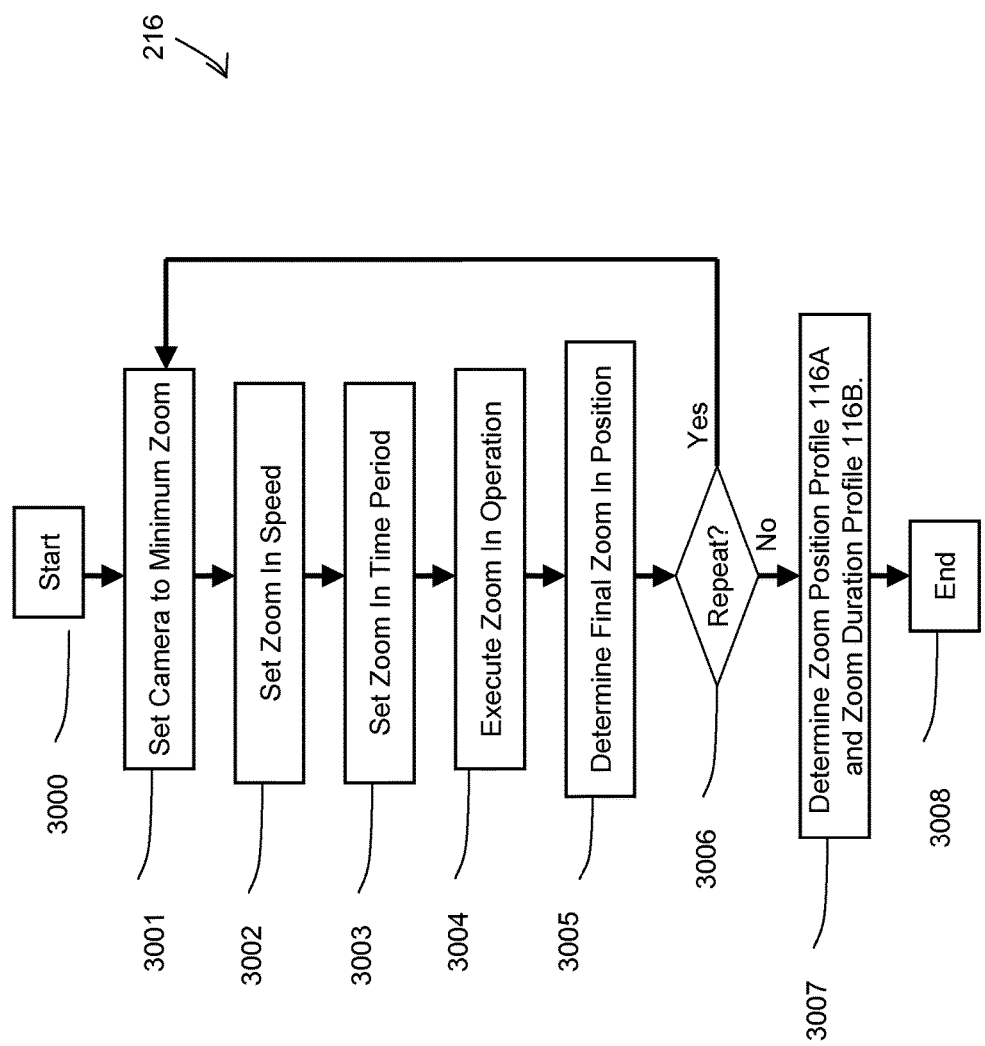
FIG. 30 depicts a flowchart for an exemplary technique by which the zoom position and duration profile engine 216 may estimate a PTZ camera's zoom position and duration profile.

FIG. 30 depicts a flowchart for an exemplary technique by which the zoom position and duration profile engine 216 may estimate a PTZ camera's zoom position and duration profile. The exemplary technique depicted in FIG. 30 starts with block 3000 and may continue to block 3001. In block 3001, the PTZ camera 101 may be set to the minimum zoom level. In block 3002, a camera zoom in speed may be set. In block 3003, a zoom in duration T, during which the zoom in operation may take place, may be set. In block 3004, a zoom in command may be executed. The zoom in command may result in the camera zooming in from the minimum zoom level, block 3001, at the assigned zoom in speed, block 3002, and for the assigned time duration T, block 3003. In block 3005, the final zoom position z may be determined. The final zoom position z may be determined by querying the camera. In block 3006, blocks 3001-3005 may be repeated for a different zoom in duration T, or continue onto block 3007. In block 3007, the zoom position profile and the zoom duration profile may be determined the camera zoom in speed. The profiles may be represented as high order polynomials fitted to a set of measurements, where each measurement (T, z) may be obtained by zooming the camera from the minimum zoom for duration T and querying the final zoom z, as described above, at a given camera zoom in speed. The inverse of this curve may represent the zoom duration profile (FIG. 2, block 216). In block 3008, the processes may return to block 3002, where a new camera zoom in speed may be set, or continue onto block 3008. In block 3008, the process ends.

Figure 31:
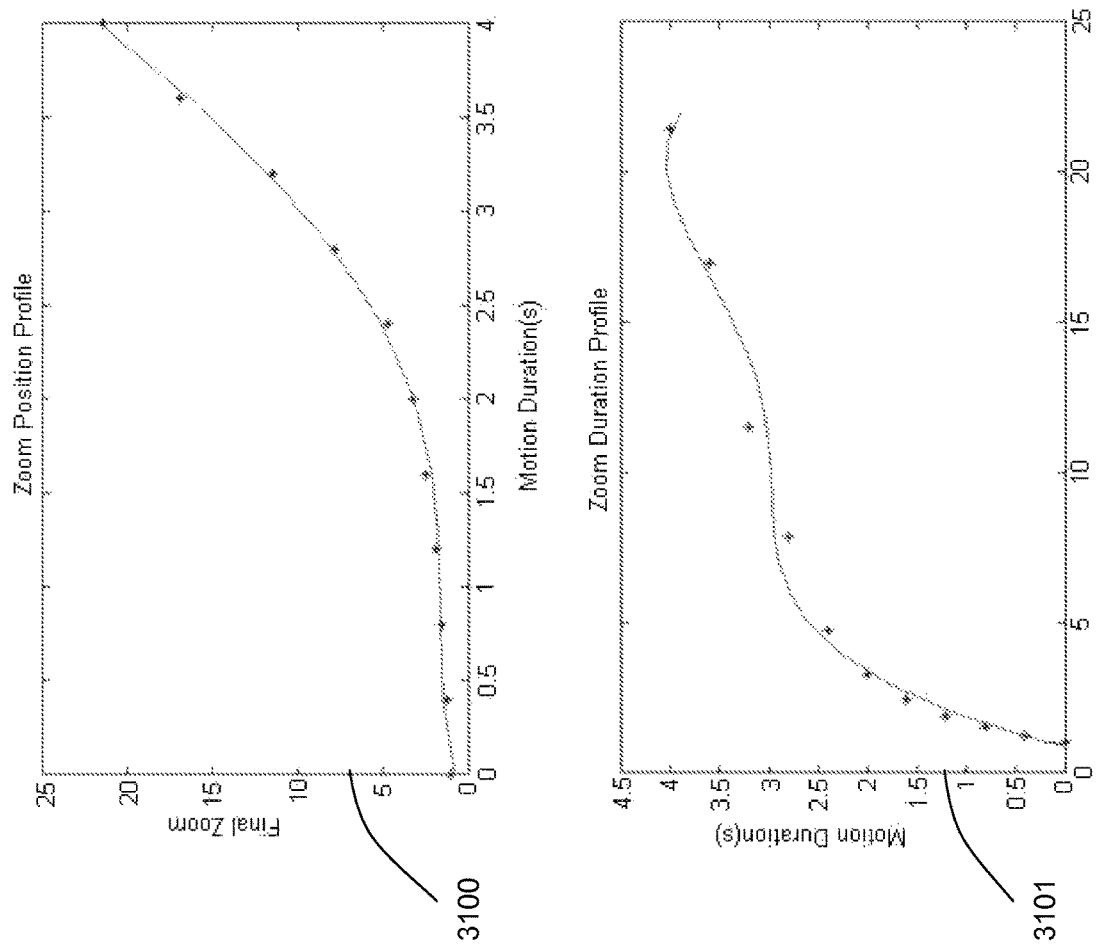
FIG. 31 depicts an exemplary measured zoom position profile and zoom duration profile for an exemplary PTZ camera.

FIG. 31 depicts an exemplary measured zoom position profile 3100 and zoom duration profile 3101 for an exemplary PTZ camera and an exemplary camera zoom in speed. According to the exemplary zoom position profile 3100 and the exemplary zoom duration profile 3101, at a given zoom in velocity, the exemplary PTZ camera moves through the lower zoom levels more slowly that the exemplary PTZ camera moves through the higher zoom levels.

Query Delay Engine 217

The query delay may be the duration between sending a query command and receiving a response from the controller. While an active camera may be being automatically controlled by the active camera system, due to possible inaccuracies in the camera calibration data and normal variations in system response due to, for example, network load etc., the camera may start to drift away if left unchecked. A camera query command may be used to detect camera drift by determining the current pan, tilt, and zoom axes of the PTZ controller. By taking into account the differential between where the camera should be and where it actually is, the results of periodic camera queries may be used to set the camera back on course.

Figure 32:
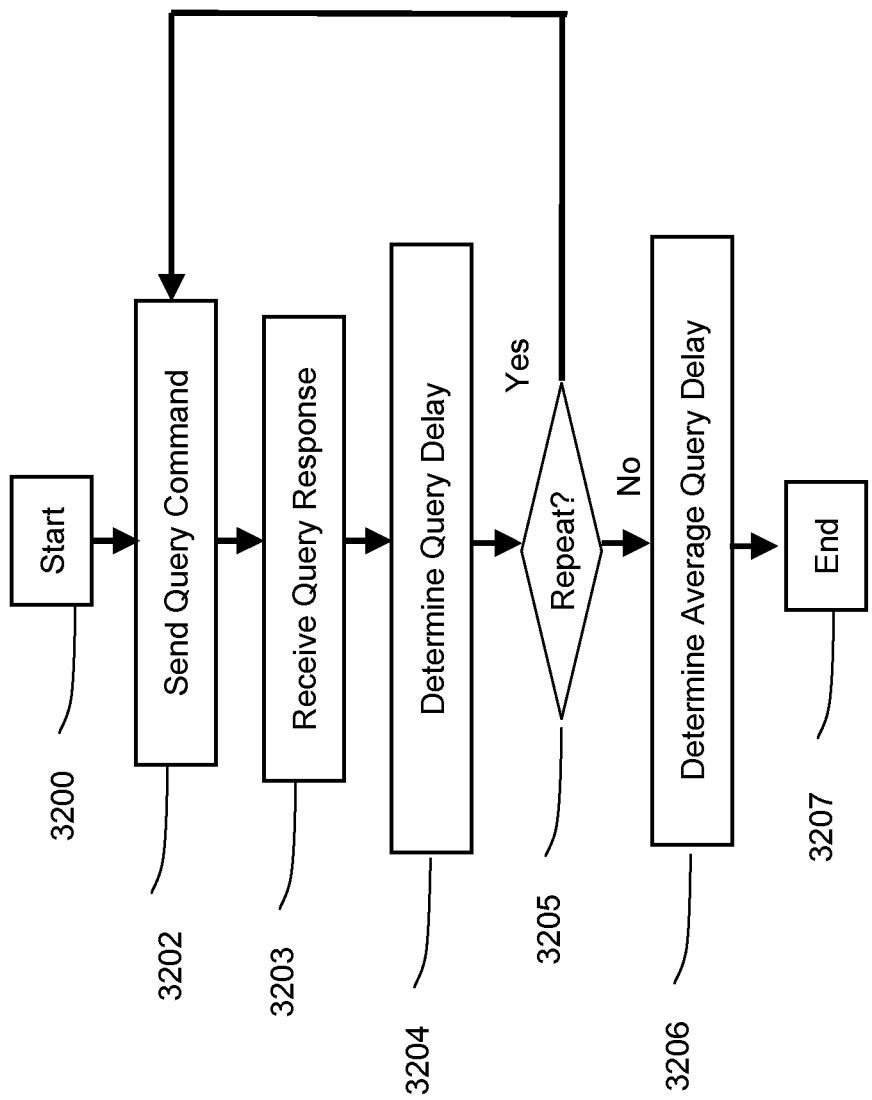
FIG. 32 depicts a flowchart for an exemplary technique by which the query delay 217 engine may estimate the query delay of an exemplary PTZ camera.

FIG. 32 depicts a flowchart for an exemplary technique by which the query delay 217 engine may estimate the query delay of an exemplary PTZ camera. The exemplary technique may begin with block 3201 and may continue to block 3202. In block 3202, the PTZ calibration module 104 may send a query command to the PTZ camera 101 via the PTZ controller 103. In block 3203, PTZ calibration module 104 may receive a query response. In block 3204, the PTZ calibration module 104 may determine the query delay. In block 3205, the process may repeat blocks 3202-3204 or proceed to block 3206. In block 3206, the average query delay is determined based on the amount of times blocks 3202-3204 were repeated.

Minimum Query Interval Engine 218

The minimum query interval may refer to the minimum period of time between sending a first query command and a second query command so that a valid response is received in response to the second query command. If the second query command were sent before the minimum query interval expired, the PTZ camera would not respond to the second query. Therefore, in order to prevent camera drift, the minimum query interval may be equal to the query delay.

Figure 33:
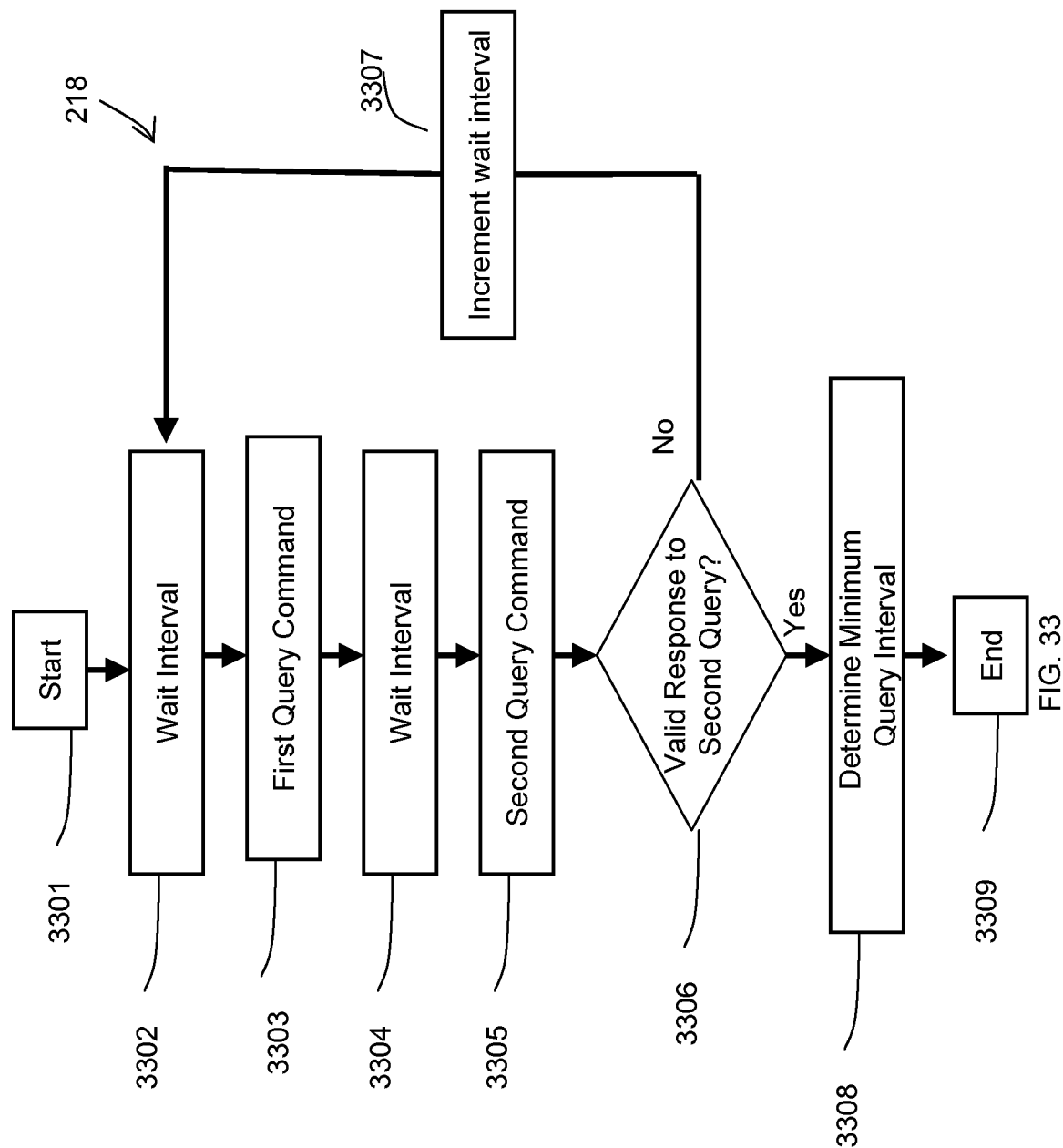
FIG. 33 depicts an exemplary technique by which the minimum query interval engine 218 may estimate the minimum query interval for exemplary PTZ camera.

FIG. 33 depicts an exemplary technique by which the minimum query interval engine 218 may estimate the minimum query interval for an exemplary PTZ camera. The exemplary technique may begin with block 3301 and may continue to block 3302. In block 3302, the PTZ calibration module 104 may issue no commands during a wait interval. In block 3303, the PTZ calibration module 104 may send a first query command to the PTZ camera 101 via the PTZ controller 103 once the wait interval is over. In block 3304, the PTZ calibration module 104 will avoid issuing any further commands during the wait interval. In block 3305, PTZ calibration module 104 may send a second query command to the PTZ camera 101 via the PTZ controller 103 once the wait interval is over. In decision block 3306, the PTZ calibration module 104 may determine if a valid response is received from the PTZ camera 101 in response to the second query command. A valid response from the PTZ camera 101 may contain the PTZ camera's position information. If a valid response is not detected in block 3306, the wait interval may be increased in block 3307. In block 3302, the PTZ calibration module 104 may avoid issuing any further commands during an updated wait interval before continuing onto block 3303.

Once a valid response is detected in block 3306, a PTZ camera's 101 minimum query interval may be determined in block 3308. The minimum query interval may be determined in block 3308 by identifying the minimum amount of time required between sending consecutive query commands and receiving a valid response from the second inquiry. In block 3309, the process ends.

Output Camera Parameter(s)

Referring back to FIG. 3, once one or more of a PTZ camera's parameters have been identified in block 302, one or more of the parameter's may be output to the PTZ controller 103. The PTZ controller 103 may then use the information from the PTZ calibration module 104 to translate information input from the video-analysis module 102 into executable commands for the PTZ camera 101.

Exemplary Embodiments

Exemplary embodiments of engines 210-219 of FIG. 2 may be implemented in software code embodied on a computer readable medium that is executed by a computer or a computer system. The present invention may be embodied in many different ways as a software component. For example, it may be a stand-alone software package, or it may be a software package incorporated as a "tool" in a larger software product, such as, for example, an image processing and analysis product. It may be downloadable from a network, for example, a website, as a stand-alone product or as an add-in analysis package for installation in an existing software application. It may also be available as a client-server software application, or as a web-enabled software application.

Figure 34:
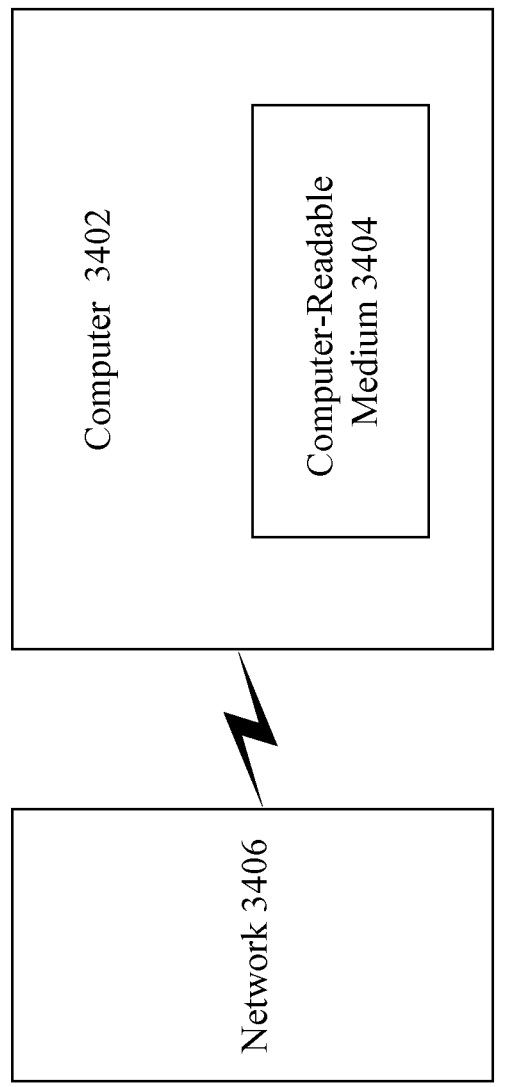
FIG. 34 depicts an exemplary computer system for use with embodiments of the present invention.

Exemplary embodiments of the systems of the present invention may be implemented in software and a computer or computer system. Exemplary embodiments of the techniques of the present invention may be performed by the execution of software on a computer. FIG. 34 depicts an exemplary computer system for use with embodiments of the present invention. The computer system 3400 may include a computer 3402 for implementing the invention. The computer 3402 may include a computer-readable medium 3404 embodying software for implementing the invention and/or software to operate the computer 3402 in accordance with the invention. As an option, the computer system 3400 may include a connection to a network 3406. With this option, the computer 3402 may be able to send and receive information (e.g., software, data, and documents) from other computer systems via the network 3406.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

In addition, the engines of FIG. 2 may be embodied as software, hardware, or a combination of both. For example, the engines of FIG. 2 may be embodied on a chip, or chip set, within the PTZ camera.

What is claimed is:

1. A method of determining an actuation delay of a pan-tilt-zoom (PTZ) camera in a camera system, the method comprising:
   issuing a velocity command to the PTZ camera by the camera system;
   capturing successive frames from the PTZ camera by the camera system;
   detecting PTZ camera motion by comparing successive captured frames by the camera system;
   determining an actuation delay of the PTZ camera by the camera system, wherein the actuation delay is the amount of time between issuing the velocity command to the PTZ camera and observing PTZ camera motion;
   sending a query command to the PTZ camera;
   receiving a response to the query command from the PTZ camera; and
   determining the query delay of the PTZ camera, wherein the query delay is the amount of time between sending the query command and receiving the response to the query command.

2. The method as claimed in 1, wherein the camera system includes a PTZ controller that outputs the velocity and query commands.

3. A method of determining an actuation delay of a pan-tilt-zoom (PTZ) camera in a camera system, the method comprising:
   issuing a velocity command to the PTZ camera by the camera system;
   capturing successive frames from the PTZ camera by the camera system;
   detecting PTZ camera motion by comparing successive captured frames by the camera system; and
   determining an actuation delay of the PTZ camera by the camera system, wherein the actuation delay is the amount of time between issuing the velocity command to the PTZ camera and observing PTZ camera motion, the method further comprising:
   (a) sending a first query command to the PTZ camera;
   (b) sending a second query command to the PTZ camera after the expiration of a wait interval;
   (c) receiving a response to the second query command;
   (d) determining whether the received response comprises a valid response to the second query command and setting the minimum query interval equal to the wait interval when the minimum query interval comprises the valid response to the second query command; and
   (e) increasing the wait interval and repeating steps (a) through (d) when a non-valid response to the second query command is received.

4. The method as claimed in 3, wherein the camera system includes a PTZ controller that outputs the velocity, first query and second query commands.

5. One or more tangible non-transitory computer-readable storage media for storing computer-executable instructions executable by a computer system, the media storing one or more instructions for:
   issuing a velocity command to the PTZ camera;
   capturing successive frames from the PTZ camera;
   detecting PTZ camera motion by comparing successive captured frames; and determining an actuation delay of the PTZ camera, wherein the actuation delay is the amount of time between issuing the velocity command to the PTZ camera and observing PTZ camera motion;

sending a query command to the PTZ camera;

receiving a response to the query command from the PTZ camera; and determining the query delay of the PTZ camera, wherein the query delay is the amount of time between sending the query command and receiving the response to the query command.

6. One or more tangible non-transitory computer-readable storage media for storing computer-executable instructions executable by a computer system, the media storing one or more instructions for:

i) issuing a velocity command to the PTZ camera;

ii) capturing successive frames from the PTZ camera;

iii) detecting PTZ camera motion by comparing successive captured frames;

iv) determining an actuation delay of the PTZ camera, wherein the actuation delay is the amount of time between issuing the velocity command to the PTZ camera and observing PTZ camera motion;

v) (a) sending a first query command to the PTZ camera;

v) (b) sending a second query command to the PTZ camera after the expiration of a wait interval;

v) (c) receiving a response to the second query command;

v) (d) determining whether the received response comprises a valid response to the second query command and setting the minimum query interval equal to the wait interval when the minimum query interval comprises the valid response to the second query command; and v) (e) increasing the wait interval and repeating steps v (a) through v (d) when a non-valid response to the second query command is received.

7. A pan-tilt-zoom (PTZ) camera calibration system comprising:

a PTZ camera;

an actuation delay engine to:
issue a velocity command to the PTZ camera,
capture successive frames from the PTZ camera,
detect PTZ camera motion by comparing successive captured frames, and
determine an actuation delay of the PTZ camera, wherein the actuation delay is the amount of time between issuing the velocity command to the PTZ camera and observing PTZ camera motion; and a query delay engine to:
send a query command to the PTZ camera,
receive a response to the query command from the PTZ camera, and
determine the query delay of the PTZ camera, wherein the query delay is the amount of time between sending the query command and receiving the response to the query command.

8. The PTZ camera calibration system as claimed in claim 7, wherein each of the actuation delay engine and the query delay engine comprise respective software code embodied on a computer readable medium.

9. The PTZ camera calibration system as claimed in claim 7, wherein the actuation delay engine and the query delay engine together form part of a PTZ calibration module.

10. The PTZ camera calibration system as claimed in claim 9, further comprising a PTZ controller configured to receive information from the PTZ calibration module.

11. The PTZ camera calibration system as claimed in claim 10, wherein the PTZ controller is further configured to output commands to PTZ camera based on the received information.

12. A pan-tilt-zoom (PTZ) camera calibration system comprising:

a PTZ camera;

an actuation delay engine to:
issue a velocity command to the PTZ camera,
capture successive frames from the PTZ camera,
detect PTZ camera motion by comparing successive captured frames, and
determine an actuation delay of the PTZ camera, wherein the actuation delay is the amount of time between issuing the velocity command to the PTZ camera and observing PTZ camera motion; and a minimum query interval engine to:
(a) send a first query command to the PTZ camera;
(b) send a second query command to the PTZ camera after the expiration of a wait interval; (c) receive a response to the second query command;
(d) determine whether the received response comprises a valid response to the second query command and setting the minimum query interval equal to the wait interval when the minimum query interval comprises the valid response to the second query command; and
(e) increase the wait interval and repeating steps through (d) when a non-valid response to the second query command is received.

13. The PTZ camera calibration system as claimed in claim 12, wherein each of the actuation delay engine and the minimum query interval engine comprise respective software code embodied on a computer readable medium.

14. The PTZ camera calibration system as claimed in claim 12, wherein the actuation delay engine and the minimum query interval engine together form part of a PTZ calibration module.

15. The PTZ camera calibration system as claimed in claim 14, further comprising a PTZ controller configured to receive information from the PTZ calibration module.

16. The PTZ camera calibration system as claimed in claim 15, wherein the PTZ controller is further configured to output commands to PTZ camera based on the received information.

* * * * *